United States Patent
Shin et al.

(10) Patent No.: US 10,635,391 B2
(45) Date of Patent: Apr. 28, 2020

(54) ELECTRONIC DEVICE AND METHOD FOR CONTROLLING AN OPERATION THEREOF

(71) Applicant: Samsung Electronics Co., Ltd, Gyeonggi-do (KR)

(72) Inventors: Hyunseok Shin, Gyeonggi-do (KR); Yongsang Yun, Gyeonggi-do (KR); Sangwook Kim, Seoul (KR); Seungnyun Kim, Incheon (KR); Eunsuk Kwon, Gyeonggi-do (KR); Changryong Heo, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 559 days.

(21) Appl. No.: 15/267,496

(22) Filed: Sep. 16, 2016

(65) Prior Publication Data

US 2017/0075654 A1 Mar. 16, 2017

(30) Foreign Application Priority Data

Sep. 16, 2015 (KR) ........................ 10-2015-0130815

(51) Int. Cl.
*G06F 17/00* (2019.01)
*G06F 3/16* (2006.01)
*H04B 1/3827* (2015.01)
*G06F 3/0487* (2013.01)
*H04R 1/10* (2006.01)
*H04R 25/00* (2006.01)
*G06F 3/0346* (2013.01)

(52) U.S. Cl.
CPC ............ *G06F 3/167* (2013.01); *G06F 3/0346* (2013.01); *G06F 3/0487* (2013.01); *H04B 1/385* (2013.01); *H04R 1/1041* (2013.01); *H04R 25/00* (2013.01); *H04B 2001/3866* (2013.01); *H04R 25/554* (2013.01); *H04R 2225/55* (2013.01); *H04R 2225/61* (2013.01); *H04R 2460/03* (2013.01); *H04R 2499/11* (2013.01)

(58) Field of Classification Search
CPC ......... G06F 3/162; G06F 3/167; H04B 1/385; H04B 2001/3866; H04R 25/00; H04R 2225/55

See application file for complete search history.

(56) References Cited

U.S. PATENT DOCUMENTS

| | | | |
|---|---|---|---|
| 8,077,892 B2 | 12/2011 | Dijkstra et al. | |
| 10,099,053 B2 * | 10/2018 | Hyde | H02J 7/025 |
| 2013/0238340 A1 | 9/2013 | Walsh | |
| 2016/0057547 A1 * | 2/2016 | Burger | H04R 25/552 381/315 |

* cited by examiner

*Primary Examiner* — Joseph Saunders, Jr.

(57) ABSTRACT

According to one embodiment of the present disclosure, an electronic device may include a housing including a portion configured to detachably couple with a part of a user's ear, a sensor installed on an outer surface of the housing or in the housing, a communication circuit installed on the outer surface of the housing or in the housing, a speaker installed on the outer surface of the housing, exposed toward an eardrum of the ear, and electrically connected to the communication circuit, a processor electronically connected to the sensor, the communication circuit, and the speaker, and a memory electrically connected to the processor.

33 Claims, 18 Drawing Sheets

ELECTRONIC DEVICE AND METHOD FOR CONTROLLING AN OPERATION THEREOF

CROSS-REFERENCE TO RELATED APPLICATIONS AND CLAIM OF PRIORITY

The present application is related to and claims the benefit under 35 U.S.C. § 119(a) of Korean patent application filed on Sep. 16, 2015 in the Korean Intellectual Property Office and assigned Serial number 10-2015-0130815, the entire disclosure of which is hereby incorporated by reference.

TECHNICAL FIELD

Various embodiments of the present disclosure relate to an electronic device operated by interworking with external electronic devices and a method for controlling an operation thereof.

BACKGROUND

Recently, various electronic devices have been used in everyday life. In particular, the case in which one user carries various electronic devices and uses them has greatly increased. For example, a user may carry portable terminals (for example, cellular phone, tablet, or the like), wearable devices (for example, smart watch, smart band, or the like), and an electronic device receiving outside sounds and outputting them to himself/herself, that is, an auditory device and use them. Therefore, researches into technologies of interworking various electronic devices with each other to provide various contents or functions have been conducted. For example, the auditory device may receive and output sound data from other electronic devices (for example, portable terminal).

However, the auditory device may be hard to provide an additional function that may be operated by interworking with other devices and set the operation of these functions.

SUMMARY

To address the above-discussed deficiencies, it is a primary object to provide disclosure an electronic device operated by interworking with external electronic devices and a method for controlling an operation thereof.

Various embodiments of the present disclosure are directed to the provision of an electronic device comprising: a housing including a portion configured to detachably couple with a part of a user's ear; a sensor installed on an outer surface of the housing or in the housing; a communication circuit installed on the outer surface of the housing or in the housing; a speaker installed on the outer surface of the housing, exposed toward an eardrum of the ear, and electrically connected to the communication circuit; a processor electronically connected to the sensor, the communication circuit, and the speaker; and a memory electrically connected to the processor, wherein upon performance, the memory stores instructions to cause the processor to receive at least one audio signal from a first external device using the communication circuit, change the received audio signal to a sound signal and output the sound signal through the speaker, acquire data associated with at least a part of a state, a pose, or a movement of a user's body using the sensor, independent of the audio signal, and transmit the data or information extracted from the data to the first external device.

According to various embodiments of the present disclosure, the electronic device and the method for controlling an operation thereof may provide various functions corresponding to the external electronic devices connected to thereto.

According to various embodiments of the present disclosure, the electronic device and the method for controlling an operation thereof may control the operation of the external electronic devices connected to thereto.

According to various embodiments of the present disclosure, the electronic device and the method for controlling an operation thereof may determine the external electronic devices interworking therewith to provide the additional function associated with the external electronic device connected thereto, thereby increasing the accuracy of the operation and promote the user convenience.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
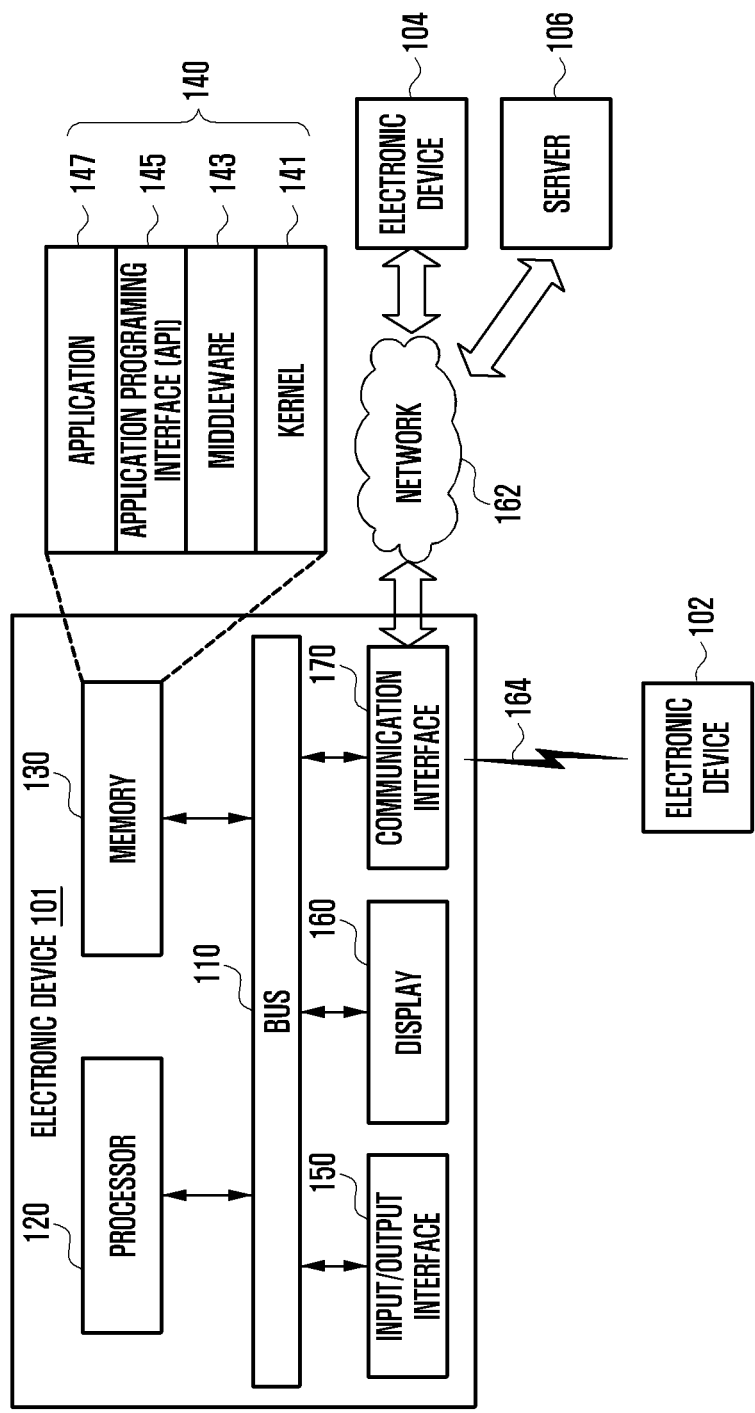
FIG. 1 illustrates an electronic device within the network environment according to various embodiments of the present disclosure.

FIGS. 1 through 18, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device.

Hereinafter, exemplary embodiments of the present disclosure are described in detail with reference to the accompanying drawings. While the present disclosure may be embodied in many different forms, specific embodiments of the present disclosure are shown in drawings and are described herein in detail, with the understanding that the present disclosure is to be considered as an exemplification of the principles of the disclosure and is not intended to limit the disclosure to the specific embodiments illustrated. The same reference numbers are used throughout the drawings to refer to the same or like parts.

An expression "comprising" or "may comprise" used in the present disclosure indicates presence of a corresponding function, operation, or element and does not limit additional at least one function, operation, or element. Further, in the present disclosure, a term "comprise" or "have" indicates presence of a characteristic, numeral, step, operation, element, component, or combination thereof described in a specification and does not exclude presence or addition of at least one other characteristic, numeral, step, operation, element, component, or combination thereof.

In the present disclosure, an expression "or" includes any combination or the entire combination of together listed words. For example, "A or B" may include A, B, or A and B.

An expression of a first and a second in the present disclosure may represent various elements of the present disclosure, but do not limit corresponding elements. For example, the expression does not limit order and/or importance of corresponding elements. The expression may be used for distinguishing one element from another element. For example, both a first user device and a second user device are user devices and represent different user devices. For example, a first constituent element may be referred to as a second constituent element without deviating from the scope of the present disclosure, and similarly, a second constituent element may be referred to as a first constituent element.

When it is described that an element is "coupled" to another element, the element may be "directly coupled" to the other element or "electrically coupled" to the other element through a third element. However, when it is described that an element is "directly coupled" to another element, no element may exist between the element and the other element.

Terms used in the present disclosure are not to limit the present disclosure but to illustrate exemplary embodiments. When using in a description of the present disclosure and the appended claims, a singular form includes a plurality of forms unless it is explicitly differently represented.

Unless differently defined, entire terms including a technical term and a scientific term used here have the same meaning as a meaning that may be generally understood by a person of common skill in the art. It should be analyzed that generally using terms defined in a dictionary have a meaning corresponding to that of a context of related technology and are not analyzed as an ideal or excessively formal meaning unless explicitly defined.

In this disclosure, an electronic device may be a device that involves a communication function. For example, an electronic device may be a smart phone, a tablet PC (personal computer), a mobile phone, a video phone, an e-book reader, a desktop PC, a laptop PC, a netbook computer, a PDA (personal digital assistant), a PMP (portable multimedia player), an MP3 player, a portable medical device, a digital camera, or a wearable device (e.g., an HMD (head-mounted device) such as electronic glasses, electronic clothes, an electronic bracelet, an electronic necklace, an electronic appcessory, or a smart watch).

According to some embodiments, an electronic device may be a smart home appliance that involves a communication function. For example, an electronic device may be a TV, a DVD (digital video disk) player, audio equipment, a refrigerator, an air conditioner, a vacuum cleaner, an oven, a microwave, a washing machine, an air cleaner, a set-top box, a TV box (e.g., SAMSUNG HOMESYNC, APPLE TV, GOOGLE TV, etc.), a game console, an electronic dictionary, an electronic key, a camcorder, or an electronic picture frame.

According to some embodiments, an electronic device may be a medical device (e.g., MRA (magnetic resonance angiography), MRI (magnetic resonance imaging), CT (computed tomography), ultrasonography, etc.), a navigation device, a GPS (global positioning system) receiver, an EDR (event data recorder), an FDR (flight data recorder), a car infotainment device, electronic equipment for ship (e.g., a marine navigation system, a gyrocompass, etc.), avionics, security equipment, or an industrial or home robot.

According to some embodiments, an electronic device may be furniture or part of a building or construction having a communication function, an electronic board, an electronic signature receiving device, a projector, or various measuring instruments (e.g., a water meter, an electric meter, a gas meter, a wave meter, etc.). An electronic device disclosed herein may be one of the above-mentioned devices or any combination thereof. As well understood by those skilled in the art, the above-mentioned electronic devices are exemplary only and not to be considered as a limitation of this disclosure.

FIG. 1 is a block diagram 100 illustrating an electronic apparatus according to an embodiment of the present disclosure.

Referring to FIG. 1, the electronic apparatus 101 may include a bus 110, a processor 120, a memory 130, a user input module 150, a display 160, and a communication interface 170.

The bus 110 may be a circuit for interconnecting elements described above and for allowing a communication, e.g. by transferring a control message, between the elements described above.

The processor 120 can receive commands from the above-mentioned other elements, e.g. the memory 130, the user input module 150, the display 160, and the communication interface 170, through, for example, the bus 110, can decipher the received commands, and perform operations and/or data processing according to the deciphered commands.

The memory 130 can store commands received from the processor 120 and/or other elements, e.g. the user input module 150, the display 160, and the communication interface 170, and/or commands and/or data generated by the processor 120 and/or other elements. The memory 130 may include software and/or programs 140, such as a kernel 141, middleware 143, an application programming interface (API) 145, and an application 147. Each of the programming modules described above may be configured by software, firmware, hardware, and/or combinations of two or more thereof.

The kernel 141 can control and/or manage system resources, e.g. the bus 110, the processor 120 or the memory 130, used for execution of operations and/or functions implemented in other programming modules, such as the middleware 143, the API 145, and/or the application 147. Further, the kernel 141 can provide an interface through which the middleware 143, the API 145, and/or the application 147 can access and then control and/or manage an individual element of the electronic apparatus 101.

The middleware 143 can perform a relay function which allows the API 145 and/or the application 147 to communicate with and exchange data with the kernel 141. Further, in relation to operation requests received from at least one of an application 147, the middleware 143 can perform load balancing in relation to the operation requests by, for example, giving a priority in using a system resource, e.g. the bus 110, the processor 120, and/or the memory 130, of the electronic apparatus 101 to at least one application from among the at least one of the application 147.

The API 145 is an interface through which the application 147 can control a function provided by the kernel 141 and/or the middleware 143, and may include, for example, at least one interface or function for file control, window control, image processing, and/or character control.

The user input module 150 can receive, for example, a command and/or data from a user, and transfer the received command and/or data to the processor 120 and/or the memory 130 through the bus 110. The display 160 can display an image, a video, and/or data to a user.

The communication interface 170 can establish a communication between the electronic apparatus 101 and another electronic devices 102 and 104 and/or a server 106. The communication interface 170 can support short range communication protocols, e.g. a Wireless Fidelity (WiFi) protocol, a BLUETOOTH (BT) protocol, and a near field communication (NFC) protocol, communication networks, e.g. Internet, local area network (LAN), wire area network (WAN), a telecommunication network, a cellular network, and a satellite network, or a plain old telephone service (POTS), or any other similar and/or suitable communication networks, such as network 162, or the like. Each of the electronic devices 102 and 104 may be a same type and/or different types of electronic apparatus.

Figure 2:
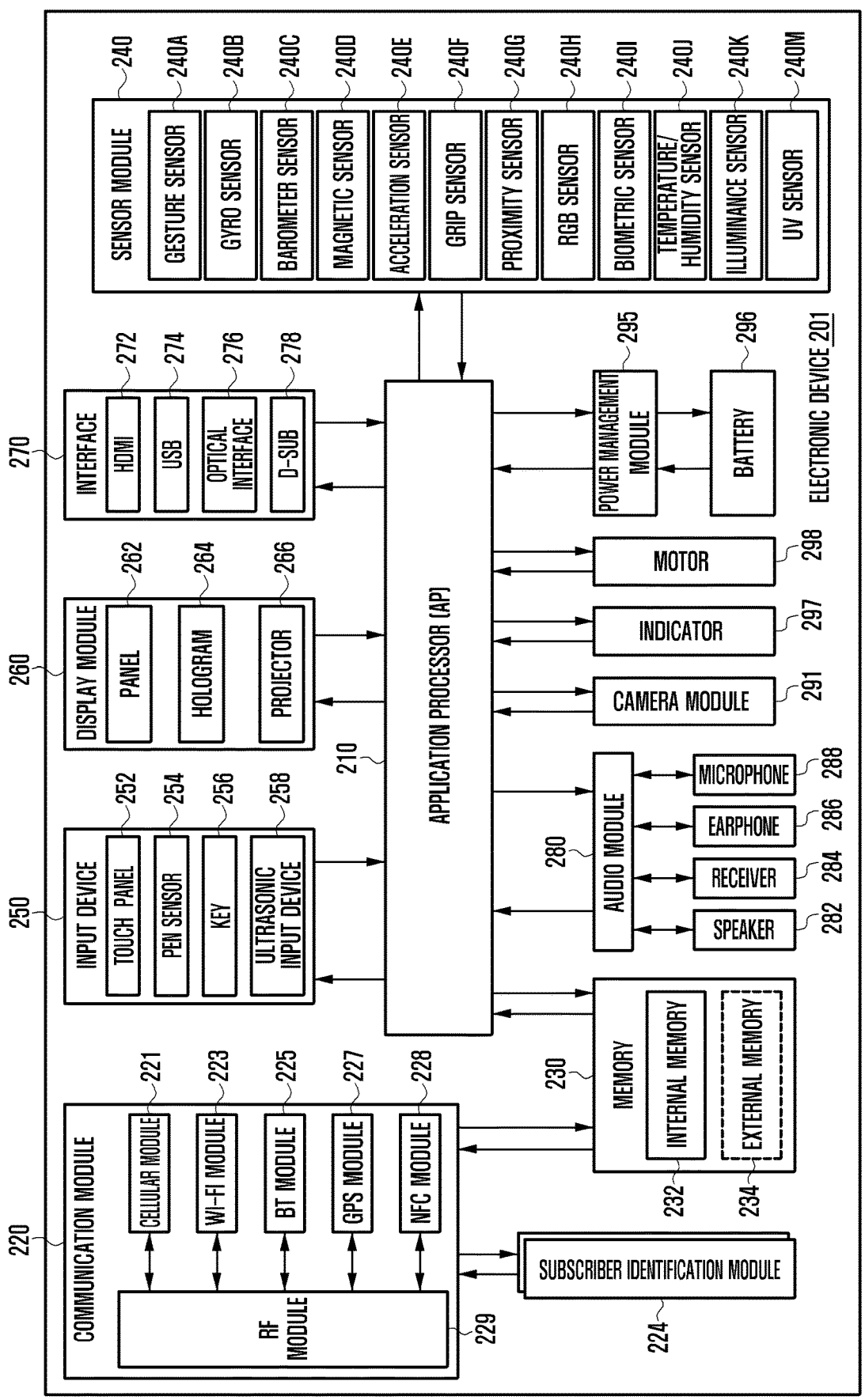
FIG. 2 illustrates an electronic device according to various embodiments of the present disclosure.

FIG. 2 is a block diagram illustrating an electronic device 201 in accordance with an embodiment of the present disclosure. The electronic device 201 may form, for example, the whole or part of the electronic device 201 shown in FIG. 1. Referring to FIG. 2, the electronic device 201 may include at least one application processor (AP) 210, a communication module 220, a subscriber identification module (SIM) card 224, a memory 230, a sensor module 240, an input device 250, a display 260, an interface 270, an audio module 280, a camera module 291, a power management module 295, a battery 296, an indicator 297, and a motor 298.

The AP 210 may drive an operating system or applications, control a plurality of hardware or software components connected thereto, and also perform processing and operation for various data including multimedia data. The AP 210 may be formed of system-on-chip (SoC), for example. According to an embodiment, the AP 210 may further include a graphic processing unit (GPU) (not shown).

The communication module 220 (e.g., the communication interface 170) may perform a data communication with any other electronic device (e.g., the electronic device 104 or the server 106) connected to the electronic device 200 (e.g., the electronic device 101) through the network. According to an embodiment, the communication module 220 may include therein a cellular module 221, a WiFi module 323, a BT module 225, a GPS module 227, an NFC module 228, and an RF (radio frequency) module 229.

The cellular module 221 may offer a voice call, a video call, a message service, an internet service, or the like through a communication network (e.g., LTE, LTE-A, CDMA, WCDMA, UMTS, WiBro, or GSM, etc.). Additionally, the cellular module 221 may perform identification and authentication of the electronic device in the communication network, using the SIM card 224. According to an embodiment, the cellular module 221 may perform at least part of functions the AP 210 can provide. For example, the cellular module 221 may perform at least part of a multimedia control function.

According to an embodiment, the cellular module 221 may include a communication processor (CP). Additionally, the cellular module 221 may be formed of SoC, for example. Although some elements such as the cellular module 221 (e.g., the CP), the memory 230, or the power management module 295 are shown as separate elements being different from the AP 210 in FIG. 3, the AP 210 may be formed to have at least part (e.g., the cellular module 221) of the above elements in an embodiment.

According to an embodiment, the AP 210 or the cellular module 221 (e.g., the CP) may load commands or data, received from a nonvolatile memory connected thereto or from at least one of the other elements, into a volatile memory to process them. Additionally, the AP 210 or the cellular module 221 may store data, received from or created at one or more of the other elements, in the nonvolatile memory.

Each of the WiFi module 223, the BT module 225, the GPS module 227 and the NFC module 228 may include a processor for processing data transmitted or received therethrough. Although FIG. 2 shows the cellular module 221, the WiFi module 223, the BT module 225, the GPS module 227 and the NFC module 228 as different blocks, at least part of them may be contained in a single IC (Integrated Circuit) chip or a single IC package in an embodiment. For example, at least part (e.g., the CP corresponding to the cellular module 221 and a WiFi processor corresponding to the WiFi module 223) of respective processors corresponding to the cellular module 221, the WiFi module 223, the BT module 225, the GPS module 227 and the NFC module 228 may be formed as a single SoC.

Figure 3:
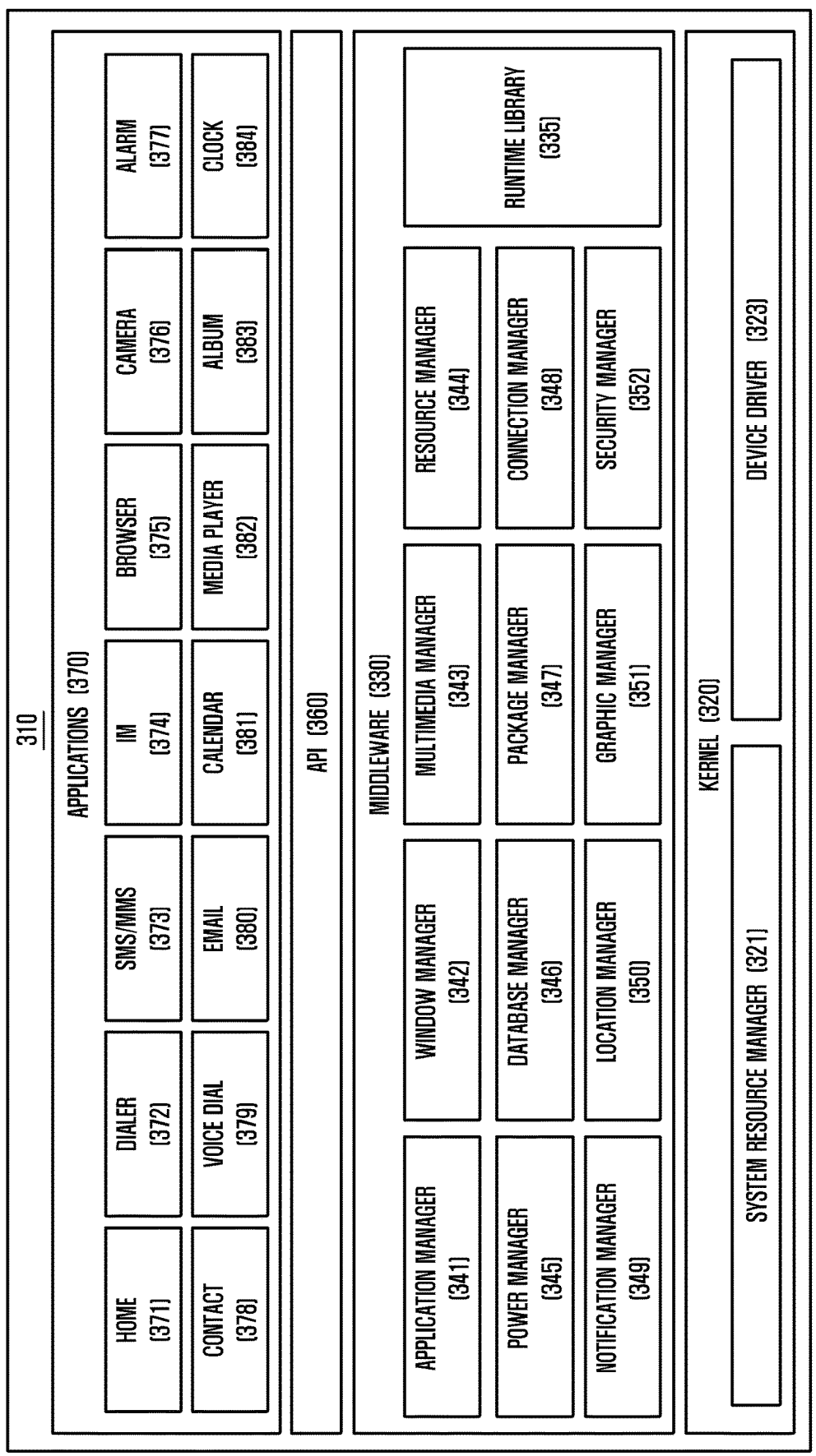
FIG. 3 illustrates a program module according to various embodiments of the present disclosure.

The RF module 229 may transmit and receive data, e.g., RF signals or any other electric signals. Although not shown, the RF module 229 may include a transceiver, a PAM (Power Amp Module), a frequency filter, an LNA (low noise amplifier), or the like. Also, the RF module 229 may include any component, e.g., a wire or a conductor, for transmission of electromagnetic waves in a free air space. Although FIG. 3 shows that the cellular module 221, the WiFi module 223, the BT module 225, the GPS module 227 and the NFC module 228 share the RF module 229, at least one of them may perform transmission and reception of RF signals through a separate RF module in an embodiment.

The SIM card 224 may be a specific card formed of SIM and may be inserted into a slot formed at a certain place of the electronic device 201. The SIM card 224 may contain therein an ICCID (integrated circuit card identifier) or an IMSI (international mobile subscriber identity).

The memory 230 (e.g., the memory 130) may include an internal memory 232 and an external memory 234. The internal memory 232 may include, for example, at least one of a volatile memory (e.g., DRAM (dynamic RAM), SRAM (static RAM), SDRAM (synchronous DRAM), etc.) or a nonvolatile memory (e.g., OTPROM (one time programmable ROM), PROM (programmable ROM), EPROM (erasable and programmable ROM), EEPROM (electrically erasable and programmable ROM), mask ROM, flash ROM, NAND flash memory, NOR flash memory, etc.). According to an embodiment, the internal memory 232 may have the form of an SSD (solid state drive). The external memory 234 may include a flash drive, e.g., CF (compact flash), SD (secure digital), Micro-SD (micro secure digital), Mini-SD (mini secure digital), xD (extreme digital), memory stick, or the like. The external memory 334 may be functionally connected to the electronic device 201 through various interfaces. According to an embodiment, the electronic device 301 may further include a storage device or medium such as a hard drive.

The sensor module 240 may measure physical quantity or sense an operating status of the electronic device 201, and then convert measured or sensed information into electric signals. The sensor module 240 may include, for example, at least one of a gesture sensor 240A, a gyro sensor 240B, an atmospheric sensor 240C, a magnetic sensor 240D, an acceleration sensor 240E, a grip sensor 240F, a proximity sensor 240G, a color sensor 240H (e.g., RGB (red, green, blue) sensor), a biometric sensor 240I, a temperature-humidity sensor 240J, an illumination sensor 240K, and a UV (ultraviolet) sensor 240M. Additionally or alternatively, the sensor module 240 may include, e.g., an E-nose sensor (not shown), an EMG (electromyography) sensor (not shown), an EEG (electroencephalogram) sensor (not shown), an ECG (electrocardiogram) sensor (not shown), an IR (infrared) sensor (not shown), an iris scan sensor (not shown), or a finger scan sensor (not shown). Also, the sensor module 240 may include a control circuit for controlling one or more sensors equipped therein.

The input device 250 may include a touch panel 252, a digital pen sensor 254, a key 256, or an ultrasonic input unit 258. The touch panel 252 may recognize a touch input in a manner of capacitive type, resistive type, infrared type, or ultrasonic type. Also, the touch panel 252 may further include a control circuit. In case of a capacitive type, a physical contact or proximity may be recognized. The touch panel 252 may further include a tactile layer. In this case, the touch panel 252 may offer a tactile feedback to a user.

The digital pen sensor 254 may be formed in the same or similar manner as receiving a touch input or by using a separate recognition sheet. The key 256 may include, for example, a physical button, an optical key, or a keypad. The ultrasonic input unit 258 is a specific device capable of identifying data by sensing sound waves with a microphone 288 in the electronic device 201 through an input tool that generates ultrasonic signals, thus allowing wireless recognition. According to an embodiment, the electronic device 201 may receive a user input from any external device (e.g., a computer or a server) connected thereto through the communication module 220.

The display 260 (e.g., the display 160) may include a panel 262, a hologram 264, or a projector 266. The panel 262 may be, for example, LCD (Liquid Crystal Display), AM-OLED (Active Matrix Organic Light Emitting Diode), or the like. The panel 262 may have a flexible, transparent or wearable form. The panel 262 may be formed of a single module with the touch panel 252. The hologram 264 may show a stereoscopic image in the air using interference of light. The projector 266 may project an image onto a screen, which may be located at the inside or outside of the electronic device 201. According to an embodiment, the display 260 may further include a control circuit for controlling the panel 262, the hologram 264, and the projector 266.

The interface 270 may include, for example, an HDMI (High-Definition Multimedia Interface) 272, a USB (Universal Serial Bus) 274, an optical interface 276, or a D-sub (D-subminiature) 278. The interface 270 may be contained, for example, in the communication interface 170 shown in FIG. 1. Additionally or alternatively, the interface 270 may include, for example, an MHL (mobile high-definition link) interface, an SD (secure digital) card/MMC (multimedia card) interface, or an IrDA (infrared data association) interface.

The audio module 280 may perform a conversion between sounds and electric signals. The audio module 280 may process sound information inputted or outputted through a speaker 282, a receiver 284, an earphone 286, or a microphone 288.

The camera module 291 is a device capable of obtaining still images and moving images. According to an embodiment, the camera module 291 may include at least one image sensor (e.g., a front sensor or a rear sensor), a lens (not shown), an ISP (Image Signal Processor, not shown), or a flash (e.g., LED or xenon lamp, not shown).

The power management module 295 may manage electric power of the electronic device 201. Although not shown, the power management module 295 may include, for example, a PMIC (power management integrated circuit), a charger IC, or a battery or fuel gauge.

The PMIC may be formed, for example, of an IC chip or SoC. Charging may be performed in a wired or wireless manner. The charger IC may charge a battery 296 and prevent overvoltage or overcurrent from a charger. According to an embodiment, the charger IC may have a charger IC used for at least one of wired and wireless charging types. A wireless charging type may include, for example, a magnetic resonance type, a magnetic induction type, or an electromagnetic type. Any additional circuit for a wireless charging may be further used such as a coil loop, a resonance circuit, or a rectifier.

The battery gauge may measure the residual amount of the battery 296 and a voltage, current or temperature in a charging process. The battery 296 may store or create electric power therein and supply electric power to the electronic device 201. The battery 296 may be, for example, a rechargeable battery or a solar battery.

The indicator 297 may show thereon a current status (e.g., a booting status, a message status, or a recharging status) of the electronic device 201 or of its part (e.g., the AP 210). The motor 298 may convert an electric signal into a mechanical vibration. Although not shown, the electronic device 301 may include a specific processor (e.g., GPU) for supporting a mobile TV. This processor may process media data that comply with standards of DMB (digital multimedia broadcasting), DVB (digital video broadcasting), or media flow.

Each of the above-discussed elements of the electronic device disclosed herein may be formed of one or more components, and its name may be varied according to the type of the electronic device. The electronic device disclosed herein may be formed of at least one of the above-discussed elements without some elements or with additional other elements. Some of the elements may be integrated into a single entity that still performs the same functions as those of such elements before integrated.

The term "module" used in this disclosure may refer to a certain unit that includes one of hardware, software and firmware or any combination thereof. The module may be interchangeably used with unit, logic, logical block, component, or circuit, for example. The module may be the minimum unit, or part thereof, which performs one or more particular functions. The module may be formed mechanically or electronically. For example, the module disclosed herein may include at least one of ASIC (application-specific integrated circuit) chip, FPGAs (field-programmable gate arrays), and programmable-logic device, which have been known or are to be developed.

FIG. 3 is a block diagram illustrating a configuration of a programming module 310 according to an embodiment of the present disclosure.

The programming module 310 may be included (or stored) in the electronic device 301 (e.g., the memory 330) illustrated in FIG. 1 or may be included (or stored) in the electronic device 201 (e.g., the memory 230) illustrated in FIG. 2. At least a part of the programming module 310 may be implemented in software, firmware, hardware, or a combination of two or more thereof. The programming module 310 may be implemented in hardware, and may include an OS controlling resources related to an electronic device (e.g., the electronic device 101 or 201) and/or various applications (e.g., an application 370) executed in the OS. For example, the OS may be ANDROID, iOS, WINDOWS, SYMBIAN, TIZEN, BADA, and the like.

Referring to FIG. 3, the programming module 310 may include a kernel 320, a middleware 330, an API 360, and/or the application 370.

The kernel 320 (e.g., the kernel 211) may include a system resource manager 321 and/or a device driver 323. The system resource manager 321 may include, for example, a process manager (not illustrated), a memory manager (not illustrated), and a file system manager (not illustrated). The system resource manager 321 may perform the control, allocation, recovery, and/or the like of system resources. The device driver 323 may include, for example, a display driver (not illustrated), a camera driver (not illustrated), a Bluetooth driver (not illustrated), a shared memory driver (not illustrated), a USB driver (not illustrated), a keypad driver (not illustrated), a Wi-Fi driver (not illustrated), and/or an audio driver (not illustrated). Also, according to an embodiment of the present disclosure, the device driver 323 may include an inter-process communication (IPC) driver (not illustrated).

The middleware 330 may include multiple modules previously implemented so as to provide a function used in common by the applications 370. Also, the middleware 330 may provide a function to the applications 370 through the API 360 in order to enable the applications 370 to efficiently use limited system resources within the electronic device. For example, as illustrated in FIG. 3, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352, and any other suitable and/or similar manager.

The runtime library 335 may include, for example, a library module used by a complier, in order to add a new function by using a programming language during the execution of the application 370. According to an embodiment of the present disclosure, the runtime library 435 may perform functions which are related to input and output, the management of a memory, an arithmetic function, and/or the like.

The application manager 341 may manage, for example, a life cycle of at least one of the applications 370. The window manager 342 may manage GUI resources used on the screen. The multimedia manager 343 may detect a format used to reproduce various media files and may encode or decode a media file through a codec appropriate for the relevant format. The resource manager 344 may manage resources, such as a source code, a memory, a storage space, and/or the like of at least one of the applications 370.

The power manager 345 may operate together with a basic input/output system (BIOS), may manage a battery or power, and may provide power information and the like used for an operation. The database manager 346 may manage a database in such a manner as to enable the generation, search and/or change of the database to be used by at least one of the applications 370. The package manager 347 may manage the installation and/or update of an application distributed in the form of a package file.

The connectivity manager 348 may manage a wireless connectivity such as, for example, Wi-Fi and BLUETOOTH. The notification manager 349 may display or report, to the user, an event such as an arrival message, an appointment, a proximity alarm, and the like in such a manner as not to disturb the user. The location manager 350 may manage location information of the electronic device. The graphic manager 351 may manage a graphic effect, which is to be provided to the user, and/or a user interface related to the graphic effect. The security manager 352 may provide various security functions used for system security, user authentication, and the like. According to an embodiment of the present disclosure, when the electronic device (e.g., the electronic device 101) has a telephone function, the middleware 330 may further include a telephony manager (not illustrated) for managing a voice telephony call function and/or a video telephony call function of the electronic device.

The middleware 330 may generate and use a new middleware module through various functional combinations of the above-described internal element modules. The middleware 330 may provide modules specialized according to types of OSs in order to provide differentiated functions. Also, the middleware 330 may dynamically delete some of the existing elements, or may add new elements. Accordingly, the middleware 330 may omit some of the elements described in the various embodiments of the present disclosure, may further include other elements, or may replace the some of the elements with elements, each of which performs a similar function and has a different name.

The API 460 (e.g., the API 145) is a set of API programming functions, and may be provided with a different configuration according to an OS. In the case of Android or iOS, for example, one API set may be provided to each platform. In the case of TIZEN, for example, two or more API sets may be provided to each platform.

The applications 370 (e.g., the applications 147) may include, for example, a preloaded application and/or a third party application. The applications 370 (e.g., the applications 147) may include, for example, a home application 371, a dialer application 372, a Short Message Service (SMS)/Multimedia Message Service (MMS) application 373, an Instant Message (IM) application 374, a browser application 375, a camera application 376, an alarm application 377, a contact application 378, a voice dial application 379, an electronic mail (e-mail) application 380, a calendar application 381, a media player application 382, an album application 383, a clock application 384, and any other suitable and/or similar application.

At least a part of the programming module 310 may be implemented by instructions stored in a non-transitory computer-readable storage medium. When the instructions are executed by one or more processors (e.g., the application processor 210), the one or more processors may perform functions corresponding to the instructions. The non-transitory computer-readable storage medium may be, for example, the memory 230. At least a part of the programming module 310 may be implemented (e.g., executed) by, for example, the one or more processors. At least a part of the programming module 310 may include, for example, a module, a program, a routine, a set of instructions, and/or a process for performing one or more functions.

Figure 4:
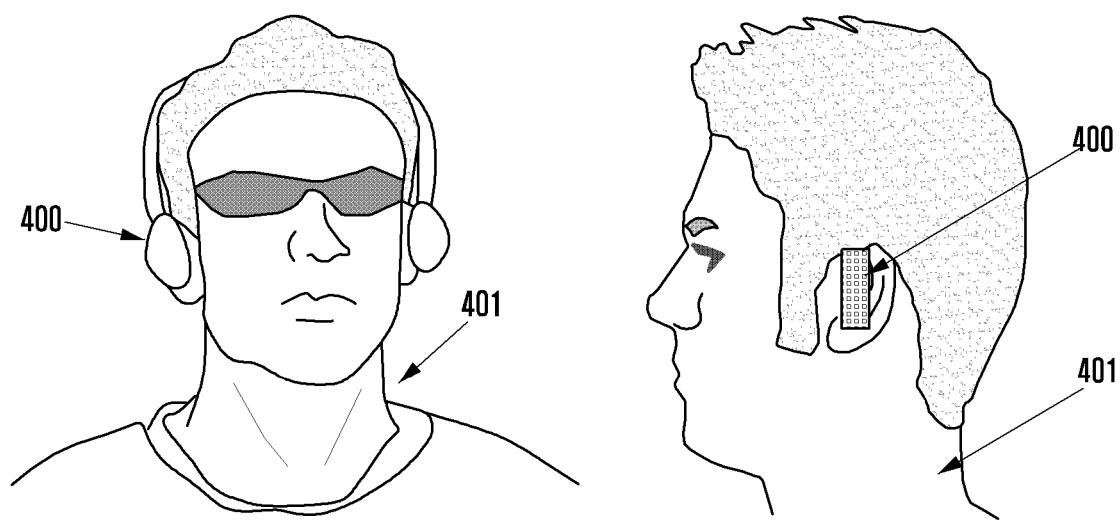
FIG. 4 illustrates a use example of the electric device according to various embodiments of the present disclosure.

FIG. 4 is a diagram illustrating a use example of an electric device 400 according to various embodiments of the present disclosure.

The electronic device 400 (for example, auditory device) may provide sound information to a user 401. For example, the electronic device 400 may amplify surrounding sound information when the user 401 listens to music or speaks over the telephone or has a conversation with someone and provide the amplified sound information to the user 401. The electronic device 400 puts on a part of a body of the user 401, and thus a receiver (for example, speaker) of the electronic device 400 may provide the sound information to the vicinity of ears of the user 401. The electronic device 400 may take various forms according to a use purpose of the personal user 401 and may provide various functions. The electronic device 400 may include, for example, a headset, a headphone, an earpiece, hearing aids, or personal sound amplification products. An example of the hearing aids may include various kinds of hearing aids such as behind-the-ear (BTE), receiver-in-canal (MC), in-the-ear (ITE), in-the-canal (ITC), and completely-in-canal (CIC).

Figure 5:
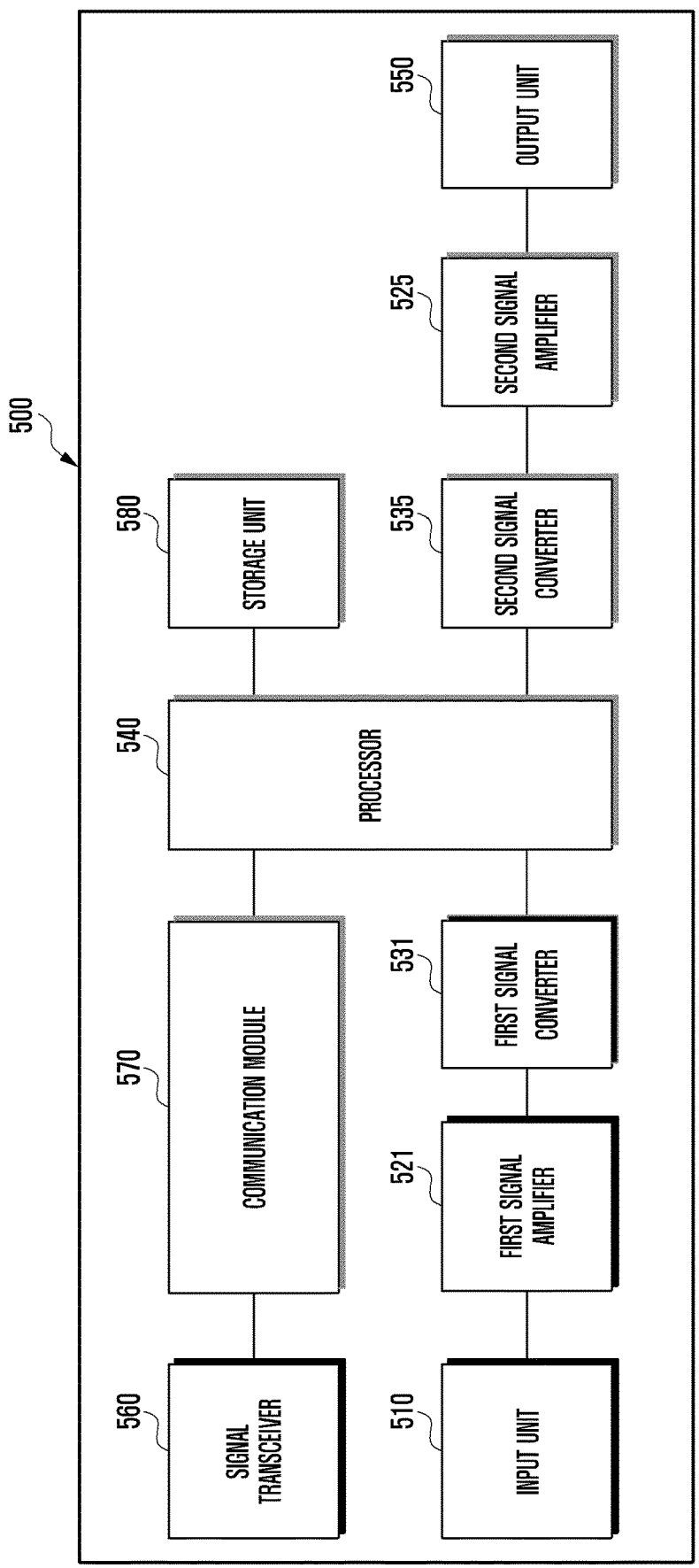
FIG. 5 illustrates the electronic device according to various embodiments of the present disclosure.

FIG. 5 is a block diagram of an electronic device 500 according to various embodiments of the present disclosure.

According to an embodiment of the present disclosure, the electronic device 500 may have the same or similar components as electronic devices 101 and 201 illustrated in FIGS. 1 and 2. For example, the electronic device 500 may include all or a part of the components of the electronic devices 101 and 201 illustrated in FIGS. 1 and 2.

The electronic device 500 may include an input unit 510 (for example, microphone), signal amplifiers 521 and 525, signal converters 531 and 535, a processor 540, an output unit 550 (for example, receiver or speaker), a signal transceiver 560, a communication module 570, and a memory 580.

The electronic device 500 may acquire sound information through the input unit 510. For example, the input unit 510 may receive a sound around the electronic device 500 to generate an input signal. According to the embodiment of the present disclosure, the input unit 510 may include at least one microphone.

The electronic device 500 may further include the signal amplifiers 521 and 525 (for example, amplifier (AMP)). The signal amplifiers 521 and 525 may amplify an analog signal. According to the embodiment of the present disclosure, the signal amplifiers 521 and 525 may include a first signal amplifier 521 (for example, pre-AMP) that amplifies a signal input through the input unit 510 and a second signal amplifier 525 (for example, power AMP) that amplifies the signal processed by the processor 540 and transmits the amplified signal to the output unit.

The electronic device 500 may be connected to external electronic devices (for example, mobile device, cellular phone, tablet, or the like) or a network in a wired or wireless manner. For example, in the case of the wireless connection, the electronic device 500 may receive the input signal through the signal transceiver 560. According to the embodiment of the present disclosure, the signal transceiver 560 may include at least one antenna.

The communication module 570 may process (for example, application of an audio filter, amplification of a signal, or the like) the input signal received through the signal transceiver 560 and may transmit the processed input signal to the processor 540.

The processor 540 may process (for example, application of an audio filter, amplification of a signal, or the like) the input signal to output a sound through the output unit. For example, the processor 540 may process the input signal received from the input unit 510 or the communication module 570 to output the sound through the output unit.

According to the embodiment of the present disclosure, the processor 540 may differently configure a signal processing (for example, application of an audio filter, amplification of a signal, or the like) scheme depending on the input signal received through the communication module 570 or the input unit 510. The processor 540 may establish a signal path (for example, audio signal path or sound signal path) depending on whether the input signal of the communication module 570 or the input unit 510 is present. For example, when the input signal is input to the processor 540 through the input unit 510, the processor 540 may establish the signal path of the input unit 510 as the output unit and output a sound. For example, when the input signal is input to the processor 540 through the communication module 570, the processor 540 may establish the signal path of the communication module 570 as the output unit. For example, the processor 540 may change the signal path from the signal path through the input unit 510 into the signal path through the communication unit according to a scheme of receiving an input signal.

For example, the processor 540 may measure a magnitude in power over time intervals to acknowledge whether the input signal through the input unit 510 is present. According to the embodiment of the present disclosure, the processor 540 may analyze the input signal to determine a mode to be performed, when the input signal is present. For example, the processor 540 may determine whether the input signal is a signal of a user or a thing or is a signal similar to a signal registered in a database (DB). According to the embodiment of the present disclosure, the processor 540 may change the mode of the electronic device 500 depending on the sound information of the input signal. For example, if it is determined that the input signal is noise, the electronic device 500 may remove the input signal (i.e., noise). For example, if the input signal is not generated beyond a specific value for a predetermined time, the processor 540 may operate at least a part of the electronic device 500 in a low power mode.

According to the embodiment of the present disclosure, the electronic device 500 may include the signal converters 531 and 535. For example, the signal converters 531 and 535 may include a first signal converter 531 (for example, analog-digital converter (ADC)) that converts an analog signal input through the input unit 510 into a digital signal and a second signal converter 535 (for example, digital-analog converter (DAC)) that converts the digital signal into the analog signal output through the output unit.

The memory 580 may store information (for example, voice information of a user, information on a sound (signal) of a specific thing, or the like) for determining a kind of input signals. The memory 580 may store mode information, function information, and auditory parameters of the electronic device 500. The auditory parameters may include, for example, information about a noise attenuation quantity, a filter value, a passing frequency, a cut-off frequency, a sound amplification value, directivity, fitting parameters for each user, or the like.

The memory 580 may store at least one instruction that is executed by the processor 540 to control the electronic device 500 to perform the corresponding function.

According to various embodiments of the present disclosure, the electronic device 500 may include all or a part of the components of the electronic device 201 illustrated in FIG. 2. For example, the electronic device 500 may include at least one sensor (for example, accelerator sensor, gyro sensor, proximity sensor, heart rate sensor, an electrocardiogram sensor, a pulse sensor, or the like). For example, the electronic device 500 may use the sensor to acquire data associated with at least a part of a state, a pose, and/or a movement of a user's body. The electronic device 500 may transmit the acquired data or information extracted from the acquired data to external devices.

Figure 6:
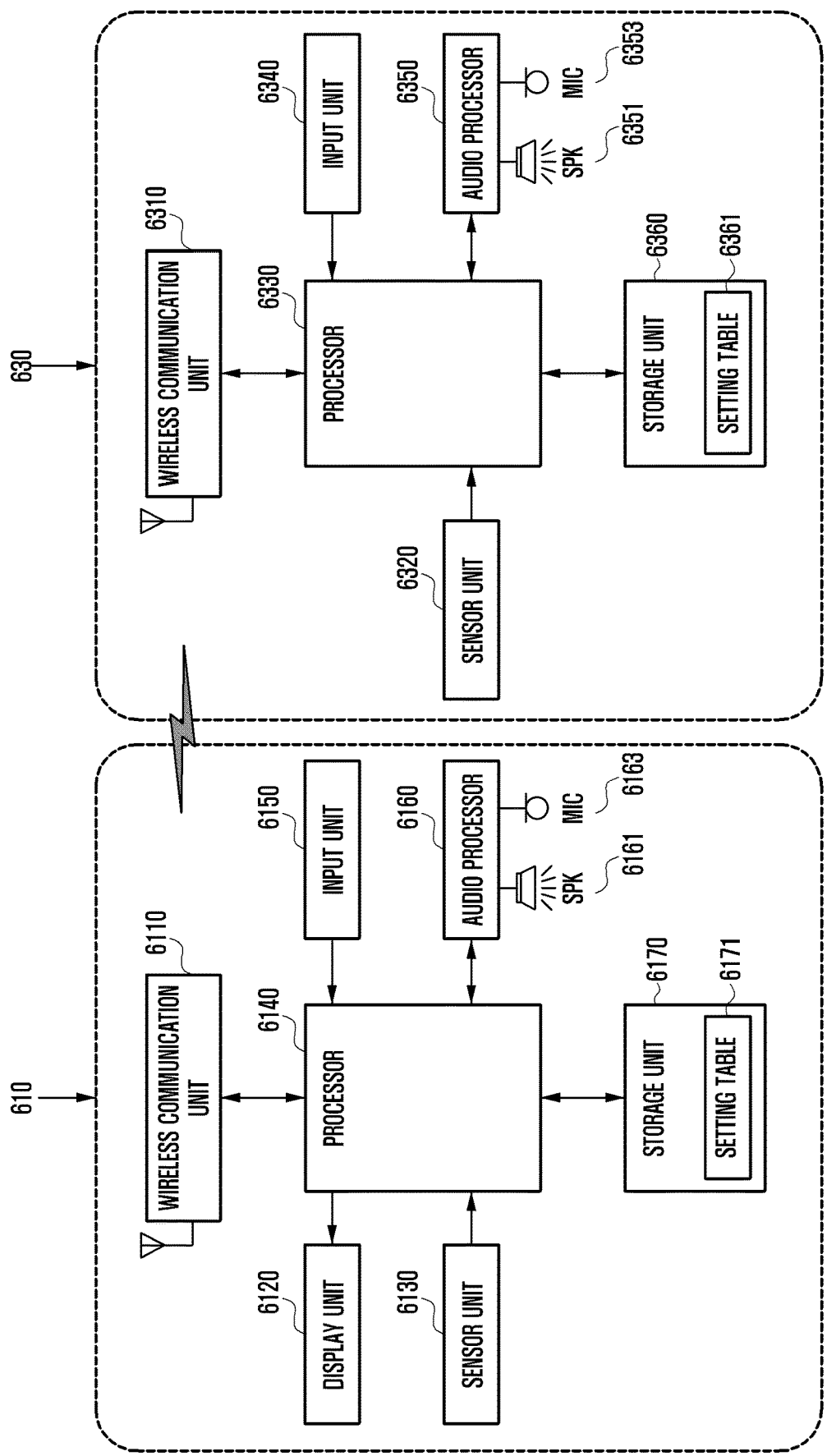
FIG. 6 illustrates an electronic device and an external electronic device according to various embodiments of the present disclosure.

FIG. 6 is a diagram illustrating an electronic device 630 and an external electronic device 610 according to various embodiments of the present disclosure.

According to various embodiments of the present disclosure, the electronic device 630 and the external electronic device 610 may include all or a part of the components of the electronic devices 101 and 201 illustrated in FIGS. 1 and 2.

According to one embodiment of the present disclosure, the electronic device 630 (for example, auditory device, or the like) may communicate with the external electronic device 610 (for example, mobile electronic device, cellular phone, tablet, or the like). The electronic device 630 and the external electronic device 610 may be paired by a wireless manner (for example, radio frequency (RF), near field magnetic induction (NFMI), BLUETOOTH (BT), audio over BLUETOOTH low energy (AoBLE), or the like). For example, when the external electronic device 610 connected to the electronic device 630 is a mobile terminal, the electronic device 630 may receive, from the mobile terminal, play music playing, call telephone, alarm, or sound information such as an input signal of a first microphone 6163 of the mobile terminal.

According to the embodiment of the present disclosure, the electronic device 630 may use the external electronic device 610 to change the setting state of the electronic device 630. For example, the electronic device 630 may not include a separate display device and may include a limited input unit 6340 (for example, button, or the like). For example, the electronic device 630 may be a kind of hearing aids and may include setting of a plurality of filter modes (for example, wide dynamic range compression (WDRC)), volumes, or the like. For example, when a user sets the mode or the volume through the input unit 6340 (for example, button, or the like) of the electronic device 630, it may be inconvenience to acknowledge the setting state or set the mode that the user wants. For example, when the electronic device 630 interworks with the external electronic device 610, the mode of the electronic device 630 may be easily set or changed using the external electronic device 610. For example, in the case of using the mobile terminal including various input devices (for example, touch key, button, or the like) and a display device, the mobile terminal may provide an UI that may control the electronic device 630 to the user and the user may use the provided UI to easily change the setting of the electronic device 630. For example, in the case of changing the volume of the electronic device 630, the user does not directly manipulate the electronic device 630 but provides a touch input to the mobile terminal, thereby controlling the volume of the electronic device 630.

According to the embodiment of the present disclosure, the electronic device 630 may include a sensor unit 6320. The sensor unit 6320 may include a proximity sensor, an accelerator sensor, a geomagnetic sensor, a biometric sensor, or the like. The electronic device 630 may use the sensor unit 6320 to acknowledge whether the user wears the electronic device 630. According to the embodiment of the present disclosure, the electronic device 630 may set a power control mode of the electronic device 630 depending on whether the user wears the electronic device 630. For example, when the electronic device 630 includes the accelerator sensor, the electronic device 630 may sense a user's movement using the accelerator sensor and may be operated in a sleep mode when a specific movement is not sensed.

According to the embodiment of the present disclosure, the electronic device 630 may be connected to the external electronic device 610 (for example, mobile electronic devices (cellular phone, tablet, or the like)) to definitely transmit a sound at a remote location to a user. The electronic device 630 may play a sound source stored in the external electronic device 610. The electronic device 630 may convert the received sound information into an audio file or a text file and store the converted file in the external electronic device 610. For example, when the signal of the first microphone 6163 of the external electronic device 610 is set in a remote microphone, the electronic device 630 may receive an audio signal of the first microphone 6163 of the external electronic device 610. For example, the audio signal received from the external electronic device 610 may be data compressed by a data compression operation. The external electronic device 610 may transmit data to the electronic device 630 through a wireless communication unit 6110 (for example, antenna, or the like). The electronic device 630 may receive data through the wireless communication unit 6310 (for example, antenna, or the like) and separate audio information included in a data format and output the separated audio information through a second speaker 6351 by an audio information release operation.

The electronic device 630 may receive and play the sound source stored in the external electronic device 610. For example, the external electronic device 610 may store a plurality of alarm sounds. For example, the external electronic device 610 may transmit different alarm sounds to the auditory device depending on a user's situation, a system state, time, whether to receive a message, whether to receive an e-mail, or the like. The electronic device 630 separates the audio information included in the data format from the data transmitted from the external electronic device 610 and may play the separated audio information as the output of the second speaker 6351 by the audio information release operation.

The electronic device 630 may use the external electronic device 610 to record a signal. The electronic device 630 may compress and store audio data for the efficient use of the external electronic device 610. The external electronic device 610 may use a speech to text (STT) scheme to convert the audio signal into text information and store it. For example, the external electronic device 610 may use the STT scheme to store a conversation context through the electronic device 630 as a text. According to the embodiment of the present disclosure, the external electronic device 610 may add and store various types of information such as time information, sensor information, location information, or the like when storing the conversation content as the text. The external electronic device 610 may display the stored conversation content on a display unit. According to the embodiment of the present disclosure, the external electronic device may use a text to speech (TTS) scheme to change the text information to the audio signal and transmit the changed audio signal to the electronic device 630. The electronic device 630 may output the audio signal transmitted from the external electronic device 610 through the second speaker 6351.

The electronic device 630 may transmit a signal received through a second microphone 6353 to the external electronic device 610. The external electronic device 610 may store the signal transmitted from the electronic device 630. To decrease power consumed to transmit a signal, the electronic device 630 may perform data compression on the signal and transmit the compressed signal to the external electronic device 610. The electronic device 630 may include a codec that compresses audio data and decompresses the compressed audio data. The external electronic device 610 may receive the signal received through the second microphone 6353 of the electronic device 630 and performs the STT conversion on the received signal to be stored as the text. The external electronic device 610 may output data received from the electronic device 630 or the stored data through a first speaker (SPK) 6161.

According to the embodiment of the present disclosure, the electronic device 630 and the external electronic device 610 may use each of the audio processors 6160 and 6350 (for example, first microphone (MIC) 6163 and the first speaker 6161 of the external electronic device 610 and the second microphone 6353 and the second speaker 6351 of the electronic device 630) to provide a call function between remote locations to a user.

According to various embodiments of the present disclosure, the electronic device 630 may form a network with additional external electronic devices connected to the external electronic device 610. For example, the electronic device 630 may transmit and receive data to and from other electronic devices connected to the external electronic device 610 through the external electronic device 610.

According to various embodiments of the present disclosure, the electronic device 630 or the external electronic device 610 may include various electronic devices including a microphone or a speaker in addition to the portable terminal or the auditory device. For example, the electronic device 630 or the external electronic device 610 may include smart glasses including a plurality of microphones, a head mounted display (HMD), a robot, or the like.

Figure 7:
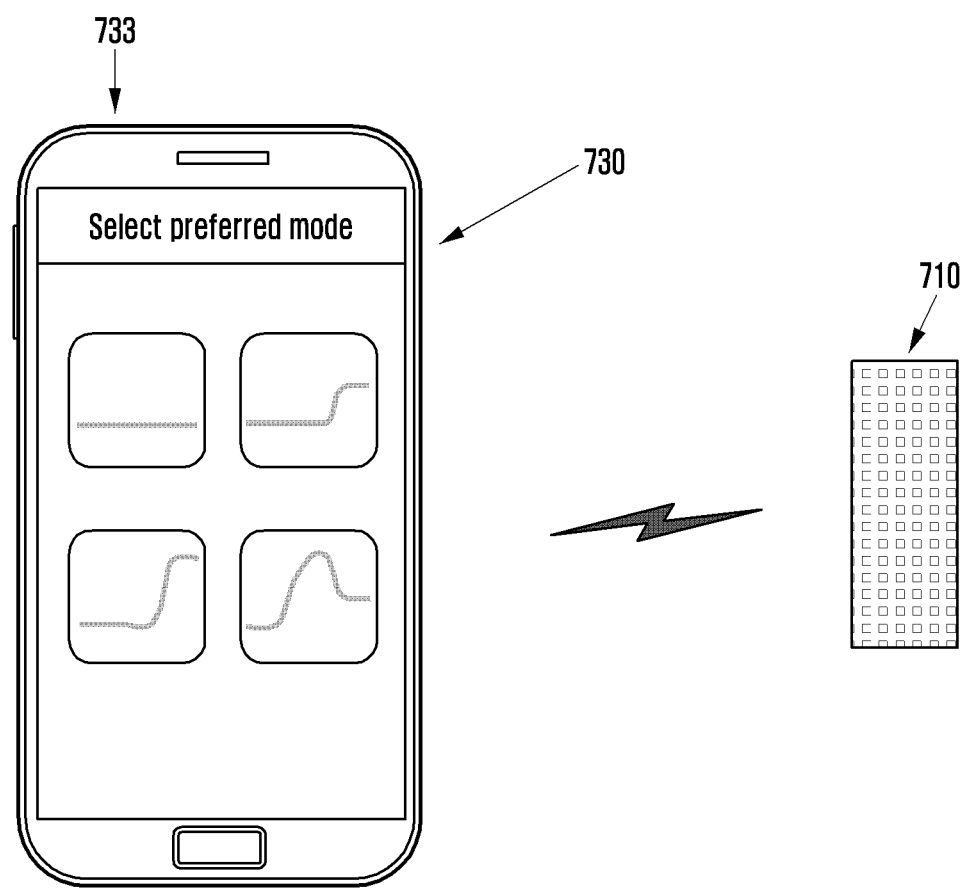
FIG. 7 illustrates an interworking operation of the electronic device with the external electronic devices according to various embodiments of the present disclosure.

FIG. 7 is a diagram for describing an interworking operation of an electronic device 710 with an external electronic device 730 according to various embodiments of the present disclosure.

The electronic device 710 may receive outside sounds through a microphone. The electronic device 710 may control or change setting of the electronic device 710 by communication with the external electronic device 730. For example, the external electronic device 730 may include a setting application of the electronic device 710. For example, the external electronic device 730 may control a mode control and a volume control of the electronic device 710 on the basis of the setting application of the electronic device 710. The external electronic device 730 may display a mode that may be set by the electronic device 710 through the display. The external electronic device 730 may change the volume or the mode of the electronic device 710 depending on the input received from the user through the input unit (for example, touch screen). According to the embodiment of the present disclosure, the external electronic device 730 may set the mode of the electronic device 710 by various sensors (for example, accelerator sensor, gyro sensor, biometric sensor, proximity sensor, or the like) included in the sensor unit. For example, when the user shakes the external electronic device 730 from side to side or up and down, the external electronic device 730 may sense it using the sensor unit. When sensing the movement, the external electronic device 730 may transmit the input signal corresponding to the movement to the electronic device 710 to control the device to change a mode. As another example, the external electronic device 730 may use the biometric sensor (for example, fingerprint sensor) to control the electronic device 710 to change a mode to the setting state corresponding to the biometric information of the user.

Figure 8:
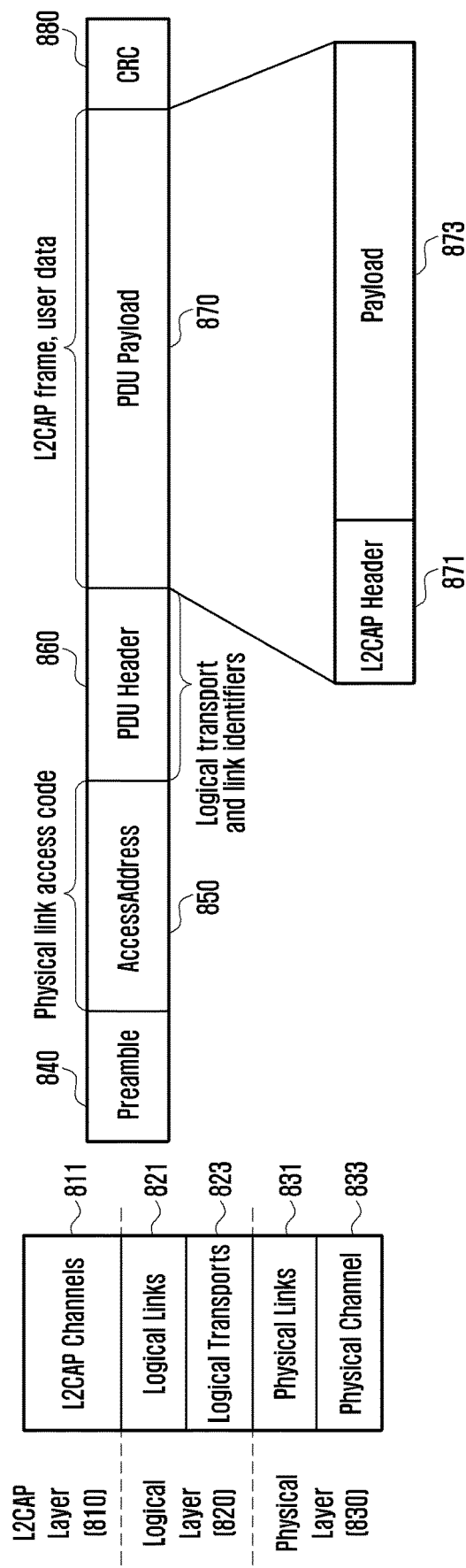
FIG. 8 illustrates a data format used in the electronic device and the external electronic devices according to various embodiments of the present disclosure.

FIG. 8 is a diagram illustrating a data format used in the electronic device 201 or the external electronic devices according to various embodiments of the present disclosure.

According to the embodiment of the present disclosure, the electronic device 201 (for example, auditory device) and the external electronic device may perform communication using the data format illustrated in FIG. 8. For example, the electronic device 201 and the external electronic device may wirelessly communicate with each other. For example, the electronic device 201 and the external electronic device may use a BLUETOOTH low energy (BLE) format as the data format when they wirelessly communicate with each other. For example, the electronic device 202 and the external electronic device may modify a part of the BLE format when they communicate with each other to use an audio over BLE (AoBLE) format that may exchange the audio signal.

According to the embodiment of the present disclosure, the electronic device 201 or the external electronic device may include a logical link control and adaptation protocol (L2CAP) layer 810, a logical layer 820, and a physical layer 830. The L2CAP layer may include an L2CAP channel. The logical layer may include a logical link 821 and a logical transport 823. The physical layer may include a physical link 831 and a physical channel 833.

According to the embodiment of the present disclosure, the data format may include a preamble 840, an access address 850, a protocol data unit (PDU) header 860, a PDU payload 870, and a cyclic redundancy check (CRC) 880.

According to the embodiment of the present disclosure, the access address 850 may include a physical link access code. The PDU header 860 may include an identifier of the logical transport and the link. The PDU payload 870 may include an L2CAP frame and a user data. According to the embodiment of the present disclosure, the PDU payload 870 may include an L2CAP header 871 and a payload 873.

According to the embodiment of the present disclosure, the electronic device 201 and the external electronic device may exchange voice data, a sampling rate of an audio processor (for example, codec), a frame size, setting data on whether activation is made, or the like with each other while carrying them on the PDU payload 870. According to the embodiment of the present disclosure, the L2CAP header unit of the transmission data format may include an operation (OP) code that divides a kind of data.

Figure 9:
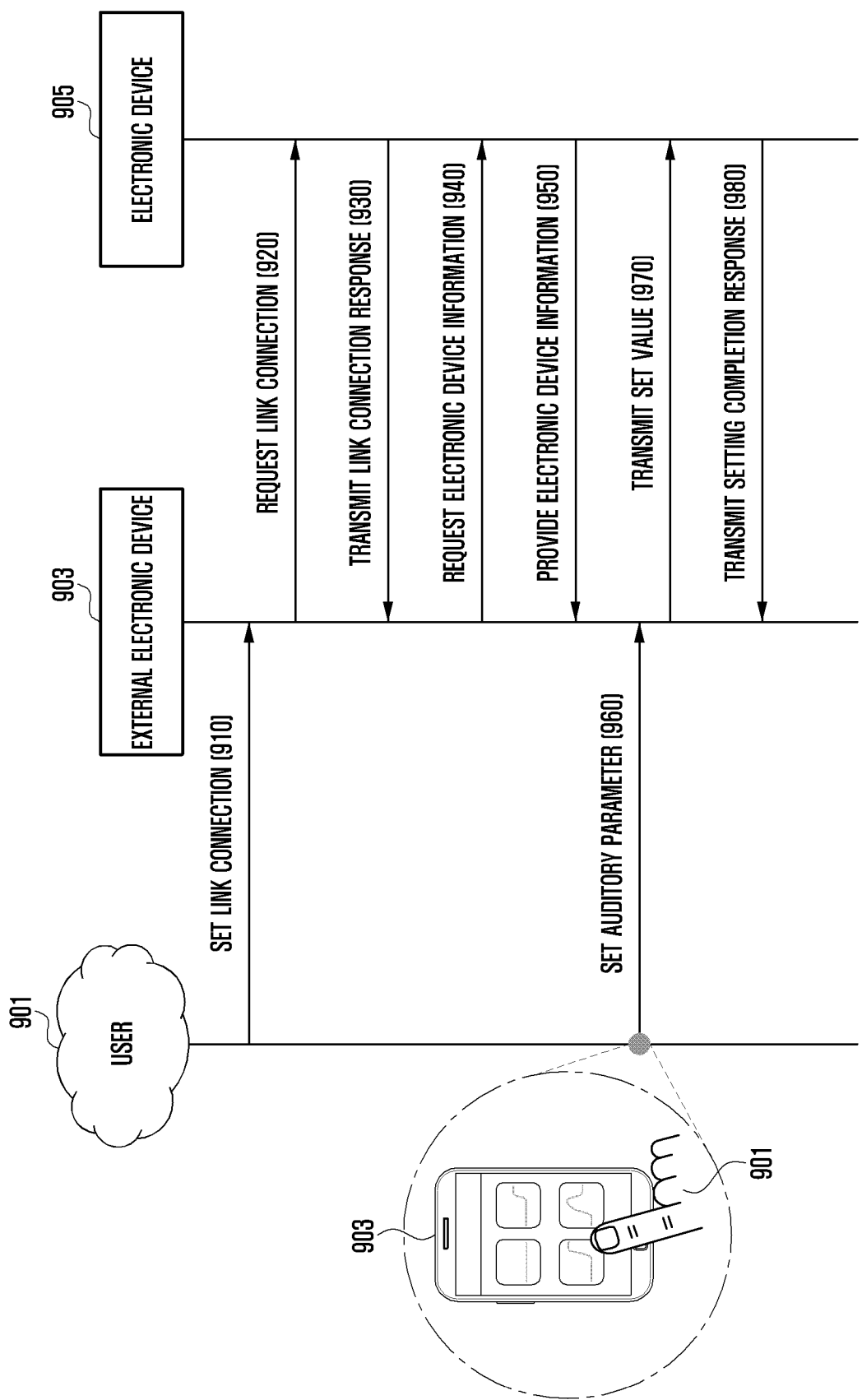
FIG. 9 illustrates a signal flow between the electronic device and the external electronic devices according to various embodiments of the present disclosure.

FIG. 9 is a diagram illustrating a signal flow between an electronic device 905 and an external electronic device 903 according to various embodiments of the present disclosure.

According to the embodiment of the present disclosure, the electronic device 905 (for example, auditory device, or the like) may communicate with the external electronic device 903 (for example, portable terminal, or the like). The electronic device 905 may use the external electronic device 903 to change the setting.

In operation 910, the electronic device 903 may receive an input (for example, link connection setting) for communication with the electronic device 905 from a user 901. For example, the external electronic device 903 may display the connectable electronic device 905 or other devices on the display. When receiving an input for selecting the electronic device 905 or other devices from the user 901, the external electronic device 903 may try the communication with the selected electronic device 905 or other devices.

In operation 920, the external electronic device 903 may transmit a link connection request to the electronic device 905. For example, the external electronic device 903 may transmit the link connection request to the electronic device 905 selected depending on the input of the user 901.

In operation 930, the electronic device 905 may transmit a link connection response to the external electronic device 903 in response to the link connection request. According to the embodiment of the present disclosure, if the link is connected to the electronic device 905, the external electronic device 903 may display a user interface informing that the link is connected.

In operation 940, the external electronic device 903 may request information to the electronic device 905. For example, the external electronic device 903 may request setting characteristics in the electronic device 905. For example, the external electronic device 903 may request mode information, function information, setting information, or the like of the electronic device 905.

In operation 950, the electronic device 905 may transmit information to the external electronic device 903. For example, the electronic device 905 may respond to the information request of the external electronic device 903 to transmit the setting information corresponding to the information request to the external electronic device 903.

In operation 906, the external electronic device 903 may receive auditory parameter setting from the user. According to the embodiment of the present disclosure, the external electronic device 903 may display the mode information of the electronic device 905 or at least one of the auditory parameters settable. For example, the external electronic device 903 may display the setting data of the electronic device 905 or the auditory parameter information settable on the basis of the information received from the electronic device 905. The external electronic device 903 may receive, from the user 901, the displayed mode of the electronic device 905, at least one mode of the auditory parameters of the user 901, or an input for selecting the auditory parameters.

In operation 970, the external electronic device 903 may transmit the mode or auditory parameters selected depending on the input of the user 901 to the electronic device 905. For example, the external electronic device 903 may transmit a specific mode setting value selected depending on the input of the user 901 to the electronic device 905.

In operation 980, a setting completion response may be transmitted to the external electronic device 903. According to the embodiment of the present disclosure, the electronic device 905 may update filter information of the audio processor (for example, codec) on the basis of the auditory parameter or the mode setting value received from the external electronic device 903. For example, the electronic device 905 may change directivity receiving a sound from the outside, a filter value for filtering the received sound information, a cut-off frequency band (or pass frequency band), or the like depending on the auditory parameter or mode setting value received. The electronic device 905 may change the setting depending on the received setting value and then transmit the setting completion response to the external electronic device 903.

According to the embodiment of the present disclosure, the electronic device 905 may process the sound information received from the outside on the basis of the set mode or auditory parameter and output the processed sound information through the speaker (or receiver).

Figure 10:
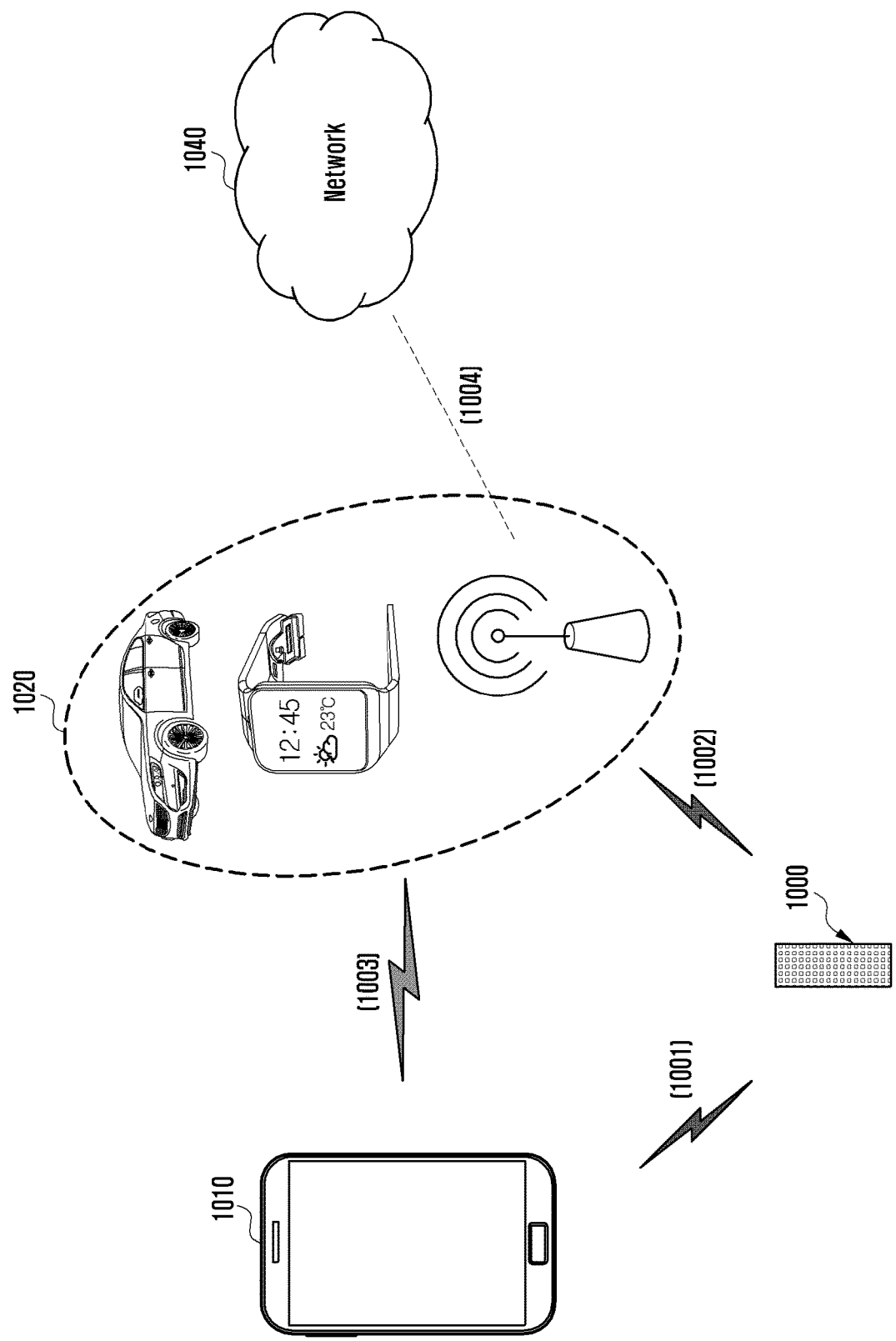
FIG. 10 illustrates a situation in which the electronic device and the external electronic devices according to various embodiments of the present disclosure communicate with each other.

FIG. 10 is a diagram for describing a situation in which an electronic device 1000 and a plurality of external electronic devices 1010 and 1020 according to various embodiments of the present disclosure communicate with each other.

According to the embodiment of the present disclosure, the electronic device 1000 may communicate with the plurality of external electronic devices (for example, first external electronic device 1010 and second external electronic device 1020) or a network 1040.

For example, the electronic device 1000 may connect the first external electronic device 1010 to a first communication 1001. The electronic device 1000 may exchange data with the first external electronic device 710. For example, the electronic device 1000 may set audio filter information of the electronic device 1000 using the first external electronic device 1010. For example, the electronic device 1000 may receive instructions or data for setting the audio filter information from the first external electronic device 1010.

The electronic device 1000 may be connected to the second external electronic device 1020 or the network 1040 through the first external electronic device 1010 to perform data communication with the first external electronic device 1010, the second external electronic device 1020, or the network 1040. For example, the first external electronic device 1010 may connect a third communication 1003 to the second external electronic device 1020. The second external electronic device 1020 may connect the network 1040 to a fourth communication 1004. For example, the electronic device 1000 may use the first external electronic device 1010 as a relay terminal to transmit and receive data to and from the second external electronic device 1020 or the network 1040. According to the embodiment of the present disclosure, the electronic device 1000 may use a communication protocol provided to the first external electronic device 1010 to exchange data to and from the second external electronic device 1020 or the network 1040. For example, the electronic device 1000 may connect the first external electronic device 1010 to a first communication 1001 through NFMI or BLE. The first external electronic device 1010 may connect the third communication 1003 to the second external electronic device 1020 or the network 1040 (including the connection through a gateway) through WiFi. The electronic device 1000 may transmit and receive data to and from the first external electronic device 1010 through the NFMI or the BLE and the first external electronic device 1010 may transmit and receive data received from the electronic device 1000 to and from the second external electronic device 1020 or the network 1040 through the WiFi. For example, the electronic device 1000 may download fitting (audio filter) data from the network through the first external electronic device 1010. As another example, the electronic device 1000 may receive and output the audio data information stored in the second external electronic device 1020 through the first external electronic device 1010.

The electronic device 1000 may connect the second communication 1002 to the second external electronic device 1020. The electronic device 1000 may support a protocol that may communicate with the second external electronic device 1020 or the network 1040. For example, the electronic device 1000 may provide a protocol (for example, 3G, LTE) for telephone communication. The electronic device 1000 may communicate with a base station to provide a call function to a user.

According to various embodiments of the present disclosure, the electronic device may include a housing including a portion configured to be detachably coupled with a part of a user's ear, a sensor installed on an outer surface of the housing or in the housing, a communication circuit installed on the outer surface of the housing or in the housing, a speaker installed on the outer surface of the housing, exposed toward an eardrum of the ear, and electrically connected to the communication circuit, a processor electronically connected to the sensor, the communication circuit, and the speaker, and a memory electrically connected to the processor. Upon the execution, the memory may store instructions to allow the processor to receive at least one audio signal from the first external device using the communication circuit, change the received audio signal to a sound signal and output the sound signal through the speaker, acquire data associated with at least a part of a state, a pose, and/or a movement of a user's body using the sensor, independent of the audio signal, and transmit the data and/or the information extracted from the data to the first external device.

The sensor may include at least one of the accelerator sensor, the gyro sensor, the proximity sensor, the heart rate sensor, the electrocardiogram sensor, the pulse sensor, and the microphone.

The reception of the audio signal and the transmission of the data and/or the information may be performed using different communication protocols or different communication profiles.

According to various embodiments of the present disclosure, the electronic device may include the housing, the display exposed on the outer surface of the housing, the communication circuit installed on the outer surface of the housing or in the housing, the processor electrically connected to the display and the communication circuit, and the memory electrically connected to the processor. Upon the execution, the memory may store instructions to allow the processor to use the communication circuit to receive the data associated with at least a part of the state, the pose, and/or the movement of the user's body acquired by the first external device and/or the information extracted from the data from the first external device, determine at least one action corresponding to the received data and/or information, and transmit a request to allow the second external device to perform at least a part of the at least one action to the second external device.

The instructions may allow the processor to transmit another request to allow the first external device to perform at least other parts of the at least one action to the first external device.

The instructions may allow the processor to transmit the audio signal to be output through the first external device to the first external device.

The instructions may allow the processor to display at least one user interface configured to control the first external device or the second external device on at least a part of the display and transmit the request to the second external device or transmit another request to allow the first external device to perform the at least other parts of the at least one action to the first external device, on the basis of the input of the user for selecting at least a part of the at least one user interface.

The at least one action may include at least one of the output of the sound signal, the generation of vibration, the display of the user interface, the execution of the specific function, and the analysis of the data and/or the information.

According to various embodiments of the present disclosure, the instructions may allow the processor to receive the information on the second external device or the information associated with the at least one action from the second external device using the communication circuit and determine the at least one action on the basis of at least a part of the information received from the second external device.

According to various embodiments of the present disclosure, the instructions may allow the processor to display the user interface corresponding to the information received from the second external device. The instructions may allow the processor to determine the at least one action to be requested to the second external device depending on the input of the user received through the user interface.

According to various embodiments of the present disclosure, the instructions may allow the processor to transmit instruction words to transmit the data associated with at least a part of the state, the pose, or the movement of the user's body acquired by the first external device or the information extracted from the data to the electronic device or the second external device to the first external device, on the basis of the information received from the second external device.

According to various embodiments of the present disclosure, the processor may receive the information on the second external device or the action from the second external device and request the data associated with at least a part of the state, the pose, or the movement of the user's body acquired by the first external device or the information extracted from the data to the first external device, on the basis of the information received from the second external device. The processor may perform at least one action on the basis of the data or information received from the first external device or may request the request to perform at least one action to the first external device or the second external device. According to various embodiments of the present disclosure, the operations of the processor are not limited to the order and each operation of the processor may be independently performed or the processor may be operated by changing the order.

According to various embodiments of the present disclosure, the electronic device may include the housing, the communication circuit installed on the outer surface of the housing or in the housing, the processor electrically connected to the communication circuit, and the memory electrically connected to the processor. Upon the execution, the memory may store instructions to allow the processor to use the communication circuit to receive the data associated with at least a part of the state, the pose, and/or the movement of the user's body acquired by the first external device and/or the information extracted from the data from the first external device, determine at least one action corresponding to the received data and/or information, receive the request to perform the at least one action from the second external device, and perform at least a part of the at least one action in response to the received request.

The instructions may allow the processor to perform at least one of the output of the sound signal through the speaker of the electronic device, the provision of the vibration through an actuator, and the display of the user interface through the display as the at least a part.

According to various embodiments of the present disclosure, the electronic device may include the housing, the communication circuit installed on the outer surface of the housing or in the housing, the processor electrically connected to the communication circuit, and the memory electrically connected to the processor. Upon the execution, the memory may store instructions to allow the processor to use the communication circuit to receive the data associated with at least a part of the state, the pose, and/or the movement of the user's body acquired by the first external device and/or the information extracted from the data from the first external device, and transmit the request to allow the second external device to perform at least one operation corresponding to the received data and/or the information to the second external device.

The instructions may allow the processor to determine to what extent a part of the user's body moves on the basis of the received data and/or information and transmit the request to perform at least one operation to the first external device or the second external device when a part of the user's body moves beyond the preset reference.

The at least one operation may include an operation of outputting a sound beyond a preset size or an operation of generating vibration beyond a preset strength.

The instructions may allow the processor to receive the information on the second external device from the second external device and determine the at least operation on the basis of the received information on the second external device.

The instructions may allow the processor to transmit the audio signal to be output through the first external device to the first external device.

The electronic device and the first external device may transmit and receive the data and/or the information and the audio signal using different communication protocols or different communication profiles.

According to various embodiments of the present disclosure, the electronic device may include a housing including a portion configured to be detachably coupled with a part of a user's ear, a sensor installed on an outer surface of the housing or in the housing, a communication circuit installed on the outer surface of the housing or in the housing, a speaker installed out the outer surface of the housing, exposed toward an eardrum of the ear, and electrically connected to the communication circuit, a processor electronically connected to the sensor, the communication circuit, and the speaker, and a memory electrically connected to the processor. According to the embodiment of the present disclosure, upon the execution, the memory may store instructions to allow the processor to sense whether the user wears the electronic device using the sensor, transmit the information on whether the user wears the electronic device to the external electronic device using the communication circuit, receive, by the external electronic device, data on a recorded sound while the user does not wear the electronic device from the external electronic device using the communication circuit if it is sensed that the user wears the electronic devices, and output a sound corresponding to the data received from the external electronic device through the speaker.

According to various embodiments of the present disclosure, the electronic device may include at least one microphone, the communication circuit, the processor electrically connected to the at least one microphone, and the memory electrically connected to the processor. According to the embodiment of the present disclosure, upon the execution, the memory may store instructions to allow the processor to receive the information on whether the user wears the external electronic device from the external electronic device using the communication circuit, record the outside sound of the electronic device using the at least one microphone if it is acknowledged based on the received information that the user does not wear the external electronic device, and transmit the data on the recorded sound to the external electronic device using the communication circuit if it is acknowledged based on the received information that the user wears the external electronic device.

Figure 11:
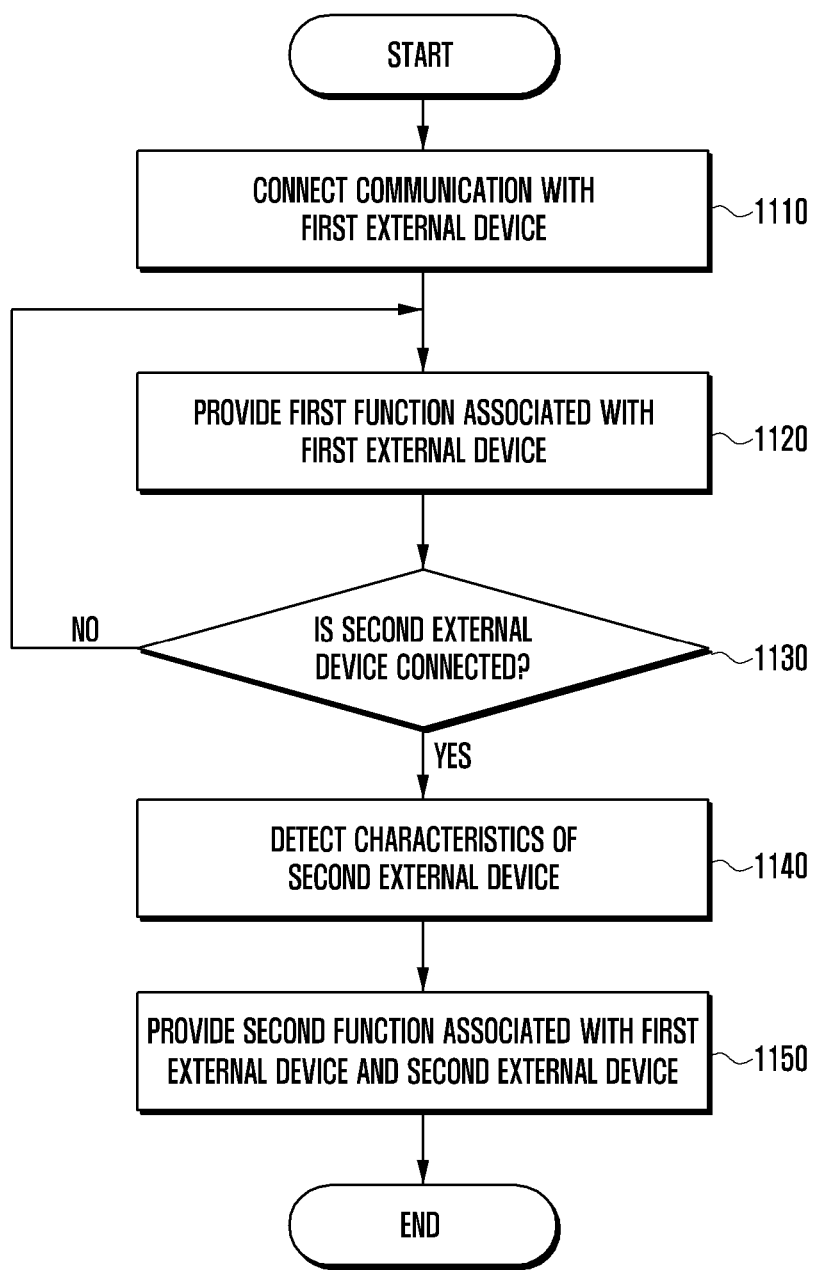
FIG. 11 illustrates a flow chart for operating an electronic device according to various embodiments of the present disclosure.

FIG. 11 is a flow chart of a method for operating an electronic device according to various embodiments of the present disclosure.

In operation 1110, according to various embodiments of the present disclosure, the electronic device (for example, mobile terminal) may connect communication with the first external device (for example, auditory device). According to the embodiment of the present disclosure, the electronic device may search for external devices to which communication may be connected. For example, the electronic device may recognize external devices present therearound. The electronic device may transmit the link connection request to the first external device. For example, the electronic device may try the link connection to the specific external device among external devices therearound that may communicate therewith. According to various embodiments of the present disclosure, the electronic device may select the external device to which the communication will be automatically connected based on the preset reference or the external device to which the communication will be connected depending on the input of the user. For example, when the auditory device (for example, hearing aids, or the like) is present around the electronic device, the electronic device may try the communication connection of the auditory device as the first external device.

The first external device may transmit the link connection response to the electronic device in response to the link connection request. According to the embodiment of the present disclosure, the electronic device and the first external device may be paired in a wireless scheme (for example, RF, NFMI, BT, AoBLE, or the like) by the link connection process.

In operation 1120, according to various embodiments of the present disclosure, the electronic device may provide a first function associated with the first external device.

According to the embodiment of the present disclosure, the electronic device may transmit the audio data to the first external device. For example, the electronic device may transmit the audio data for the pre-stored audio content, the voice file, or the alarm sound (warning sound) to the first external device. According to the embodiment of the present disclosure, the electronic device may transmit the audio data received from the outside to the first external device.

According to the embodiment of the present disclosure, the electronic device may display the user interface for controlling the first external device. For example, the electronic device may receive the input for controlling the first external device from the user through the user interface. For example, the electronic device may select the data to be transmitted to the first external device depending on the input of the user received through the user interface. For example, the electronic device may transmit the music playing, the call reception, the alarm, the sound information associated with the signal (for example, user's voice, or the like) input through the microphone of the electronic device to the first external device. According to the embodiment of the present disclosure, the electronic device may transmit the instruction corresponding to the received input of the user to the first external device. For example, the electronic device may transmit the instruction to allow the first external device to output the sound information received from the electronic device to the first external device. The electronic device may transmit the instruction to change the setting value of the first external device to the first external device. According to the embodiment of the present disclosure, the first external device may perform the corresponding function in response to the data and the instruction received from the electronic device.

In operation 1130, according to various embodiments of the present disclosure, the electronic device may sense the connection of the second external device (for example, wearable device). According to the embodiment of the present disclosure, the electronic device may search for connectable external devices that are present therearound. The electronic device may transmit the connection request to the second external device. The electronic device may receive the connection response from the second external device and connect the communication with the second external device. According to the embodiment of the present disclosure, the electronic device may recognize that the communication with the second external device is completed.

In operation 1140, according to various embodiments of the present disclosure, the electronic device may detect the characteristics of the second external device. According to the embodiment of the present disclosure, the electronic device may receive the information on the second external device from the second external device. For example, the electronic device may acknowledge a name and a kind of second electronic devices, functions that second external device supports, or the like on the basis of the information received from the second external device.

According to the embodiment of the present disclosure, the electronic device may receive the information (for example, ID of the second external device, or the like) of the second external device or the information associated with at least one action from the second external device. The electronic device may transmit the request to perform the specific action to the first external device or the second external device on the basis of at least a part of the information received from the second external device.

According to the embodiment of the present disclosure, the electronic device may display the user interface corresponding to the information received from the second external device. For example, when receiving the ID of the second external device from the second external device, the electronic device may display the ID of the second external device on the display. According to the embodiment of the present disclosure, the electronic device may receive the input of the user through the displayed user interface. The electronic device may determine and decide the action to be requested to the external device depending on the input of the user.

In operation 1150, according to various embodiments of the present disclosure, the electronic device may provide a second function associated with the first external device and/or the second external device. According to the embodiment of the present disclosure, when the electronic device is connected to the second external device, the electronic device may acknowledge functions that may be provided by interworking the electronic device, and the second external device interwork with one another. For example, when the first external device is the auditory device and the second external device is electronic devices (for example, navigation, car kit, or the like) included in a vehicle, the electronic device may determine functions that may be operated by interworking with the auditory device and the electronic devices for the vehicle.

For example, the electronic device may support functions that may be operated by interworking with the first external device and the second external device. According to the embodiment of the present disclosure, the electronic device may transmit the data and/or the information transmitted and received to and from the first external device and the second external device. For example, when the first external device and the second external device support only different communication methods, the electronic device may communicate with the first external device by a first communication method (for example, NFMI, AoBLE, or the like) and communicate with the second external device by a second communication method (for example, WiFi). The electronic device may support a plurality of communication methods to operate to transmit a signal between the first external device and the second device so that the first external device and the second external device may be operated by interworking with each other. For example, the electronic device may serve a master to control the operation of the first external device and the second external device.

For example, the electronic device may receive the sensor data, or the like acquired by the first external device from the first external device and transmit the received sensor data to the second external device. The electronic device may analyze the data received from the first external device and extract the information associated with the functions that the second external device supports and transmit the extracted information to the second external device. According to the various embodiments of the present disclosure, the electronic device may request the sensor data, or the like acquired by the first external device to the first external device, in response to the information (for example, information on the second external electronic device, or the like) received from the second external device. For example, the electronic device may recognize the function associated with the external electronic device on the basis of the information received from the second external device and request the data required to perform the functions associated with the second external electronic device to the first external device. According to various embodiments of the present disclosure, the electronic device may determine the function to be performed by interworking with the first external device or the second external device on the basis of the information received from the second external device and the data received from the first external device.

The electronic device ma transmit the instructions for controlling the first external device or the second external device to the first external device or the second external device on the basis of the data received from the first external device. For example, the electronic device may receive gesture information from the first external device to transmit the gesture information or an instruction corresponding to the gesture information to the second external electronic device. The second external electronic device may perform the operation corresponding to the gesture information or the instruction received from the electronic device.

According to various embodiments of the present disclosure, the operation order of the electronic device is not limited to the order described in FIG. 11 and therefore the electronic device may independently perform each operation or may be operated by changing the order of some of the operations.

Figure 12:
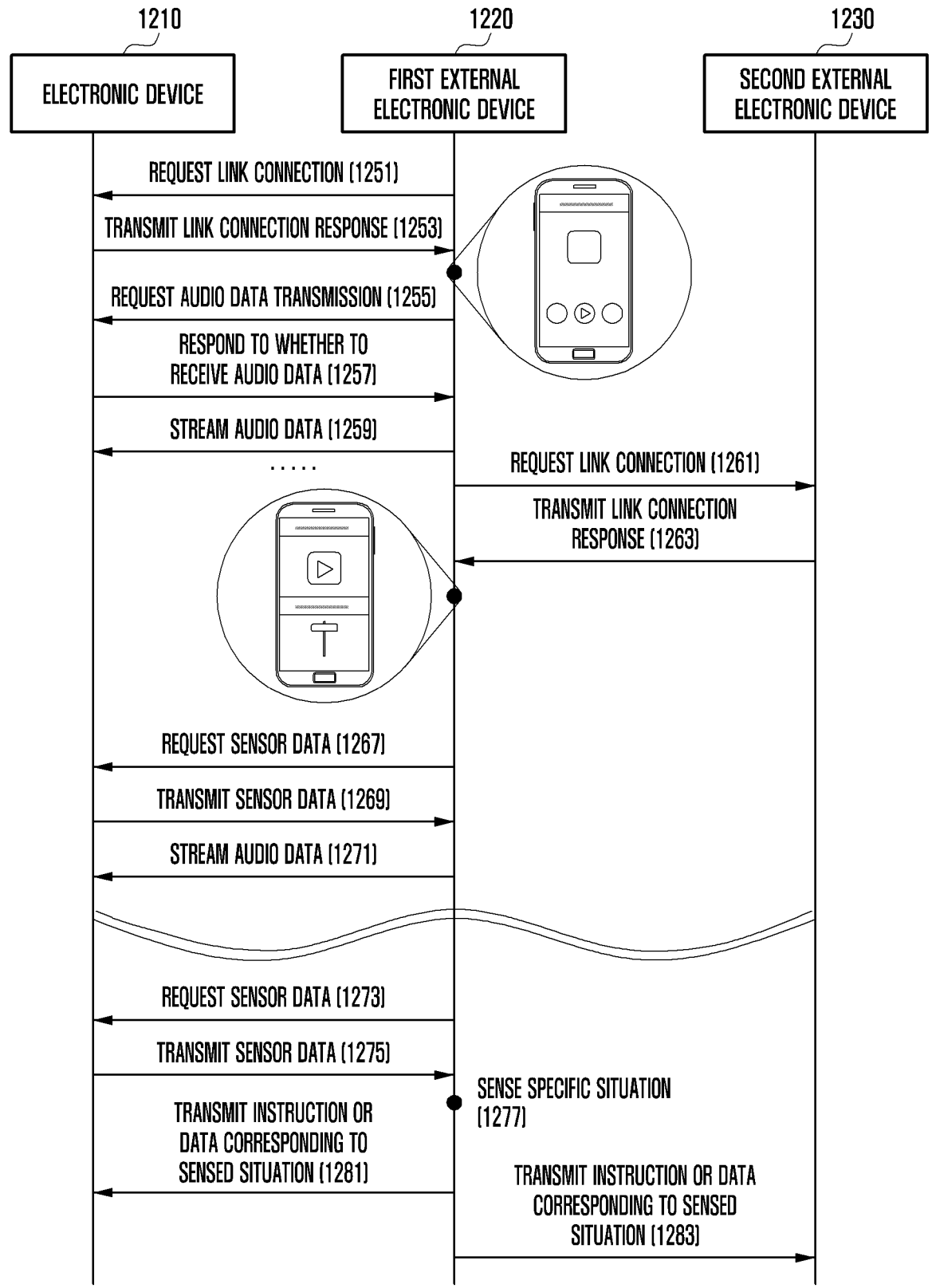
FIG. 12 illustrates the signal flow of the electronic device and external electronic devices according to various embodiments of the present disclosure.

FIG. 12 is a diagram illustrating the signal flow of the electronic device and external electronic devices according to various embodiments of the present disclosure.

In operation 1251, according to various embodiments of the present disclosure, a first eternal electronic device (for example, mobile terminal) 1220 may transmit the link connection request to an electronic device (for example, auditory device) 1210. According to the embodiment of the present disclosure, the first external electronic device 1220 may search for link connectable peripheral devices. The first external device 1220 may request the link connection to the preset device or the electronic device 1210 selected depending on the input of the user among the link connectable peripheral devices. For example, when the link connectable auditory device is present around the first external electronic device 1220, the first external electronic device 1220 may transmit the link connection request to the auditory device.

In operation 1253, according to various embodiments of the present disclosure, the electronic device 1210 may transmit the link connection response to the first external electronic device 1220. For example, the electronic device 1210 may transmit the link connection response accepting the link connection to the first external electronic device 1220 in response to the link connection request. According to the embodiment of the present disclosure, the link connection process is performed, and thus the electronic device 1210 and the first external electronic device 1220 may be paired.

In operation 1255, according to various embodiments of the present disclosure, the first external electronic device 1220 may transmit an audio data transmission request to the electronic device 1210. For example, the first external electronic device 1220 may transmit a signal acknowledging whether to receive audio streaming to the electronic device 1210.

According to the embodiment of the present disclosure, the first external electronic device 1220 may receive an input for performing a function for transmitting the audio data from the user through the user interface. For example, the first external electronic device 1220 may transmit the audio data transmission request to the electronic device 1210 depending on the input of the user.

In operation 1257, according to various embodiments of the present disclosure, the electronic device 1210 may transmit whether to receive the audio data to the first external electronic device 1220. For example, the electronic device 1210 may determine whether to receive the audio data from the first external electronic device 1220. If it is determined that the audio data may be received, the electronic device 1210 may transmit whether to receive the audio data to the first external electronic device 1220 in response to the audio data transmission request.

In operation 1259, according to various embodiments of the present disclosure, the first external electronic device 1220 may stream the audio data to the electronic device 1210. For example, the first external electronic device 1220 may transmit the pre-stored audio data to the electronic device 1210 or transmit the audio data received from the outside to the electronic device 1210 in real time. The electronic device 1210 may output the audio data received from the first external electronic device 1220 to the outside. For example, when the electronic device 1210 is the auditory device, the electronic device 1210 may output the audio data received from the first external electronic device 1220 toward the user's ear through the speaker.

According to the embodiment of the present disclosure, the electronic device 1210 may change the audio data received from the first external electronic device 1220 to the sound signal and output the sound signal. For example, the electronic device 1210 may change the received audio signal to the sound signal corresponding to the preset user information and output it. The user information may be auditory characteristic information of the user. For example, when the electronic device 1210 is the auditory device, the electronic device 1210 may store the information depending on the auditory characteristics. The electronic device 1210 may modulate, amplify, or filter at least a part of the received audio signal depending on the auditory characteristics of the user and output it.

According to the embodiment of the present disclosure, the first external electronic device 1220 may use a BT protocol to transmit the audio data to the electronic device 1210. For example, the first external electronic device 1220 may use an advanced audio distribution profile (A2DP) protocol to transmit the audio streaming (media music playing) data to the electronic device 1210. For example, when a sound data for a call sound is transmitted, the first external electronic device 1220 may use a hands-free profile (HFP) to transmit a data to the electronic device 1210. The electronic device 1210 may receive the data of the profile linked with the received audio profile and may convert the received data into a sound and output it.

In operation 1261, according to various embodiments of the present disclosure, the first external electronic device 1220 may request the link connection to the second external electronic device (for example, wearable device) 1230. According to the embodiment of the present disclosure, the first external electronic device 1220 may sense link connectable external devices therearound. The first external electronic device 1220 may be selected depending on the preset reference or may select the specific device selected depending on the input of the user as the second external electronic device 1230. The external electronic device 1220 may transmit the link connection request to the selected second external electronic device 1230.

In operation 1263, according to various embodiments of the present disclosure, the second external electronic device 1230 may transmit the link connection response to the first external electronic device 1220 in response to the link connection request. According to the embodiment of the present disclosure, the link connection process is performed, and thus the first external electronic device 1220 and the second external electronic device 1220 may be paired.

According to the embodiment of the present disclosure, the second external electronic device 1230 may transmit the information on the second external electronic device 1230 or the information associated with at least one action to the first external electronic device 1220 along with the link connection response.

According to the embodiment of the present disclosure, the first external electronic device 1220 may determine or decide an action to be requested to the electronic device 1210 or the second external electronic device 1230 on the basis of at least a part of the information received from the second external electronic device 1230. According to various embodiments of the present disclosure, the first external electronic device 1220 may determine or decide the action on the basis of at least one of the information received from the second external electronic device 1230 and the sensor data received from the electronic device 1210.

According to the embodiment of the present disclosure, the first external electronic device 1220 may display the user interface corresponding to the information received from the second external electronic device 1230. The first external electronic device 1220 may determine or decide an action to be requested to the electronic device 1210 or the second external electronic device 1230 depending on the input of the user received through the user interface.

According to the embodiment of the present disclosure, the second external electronic device 1230 may be added to the network formed between the electronic device 1210 and the first external electronic device 1220. When the second external electronic device 1230 is added to the network, the electronic device 1210 may perform additional functions by the second external electronic device 1230. For example, when the second external electronic device 1230 is a control device for a vehicle, the electronic device 1210 may additionally perform a drowsy detection operation. The electronic device 1210 may further perform an output operation in addition to a signal receiving operation.

In operation 1267, according to various embodiments of the present disclosure, the first external electronic device 1220 may request the sensor data to the electronic device 1210. According to the embodiment of the present disclosure, if it is sensed that the second external electronic device 1230 is connected, the first external electronic device 1220 may determine the functions that the second external electronic device 1230 supports. The first external electronic device 1220 may request data required to perform or support the functions that the second external electronic device 1230 supports to the electronic device 1210.

For example, when the electronic device 1210 is the auditory device that the user wears and the second external electronic device 1230 is the control device (system) for the vehicle, the electronic device 1210, the first external electronic device 1220, and the second external electronic device 1230 may interwork with one another to support the function of detecting the drowsy driving of the user. For example, it is possible to provide a function of detecting a head movement of a user by the electronic device 1210 and determine whether the user drives while drowsy to provide the function of controlling the second external electronic device 1230.

According to the embodiment of the present disclosure, when the first external electronic device 1220 is connected to the electronic device 1210 or the second external electronic device 1230, the first external electronic device 1220 may display the user interface (for example, control application of the electronic device 1210 or the second external electronic device 1230, or the like) for controlling the electronic device 1210 or the second external electronic device 1230. For example, the first external electronic device 1220 may receive an input for selecting a specific function associated with the electronic device 1210 or the second external electronic device 1230 from the user through the user interface. The first external electronic device 1220 may request the data required for the function selected depending on the input of the user to the electronic device 1210.

For example, when the second external electronic device 1230 is the control device for the vehicle, the first external electronic device 1220 (for example, mobile terminal) may display the fact that a function of preventing drowsy driving may be provided on the display. If the second external electronic device 1230 receives an input for performing the drowsy driving prevention function from the user, the second external electronic device 1230 may request the sensor data (for example, measurement data of the accelerator sensor, or the like) for determining the head movement of the user to the electronic device 1210.

In operation 1269, according to various embodiments of the present disclosure, the electronic device 1210 may transmit the sensor data to the first external electronic device 1220 in response to the sensor data request. For example, the electronic device 1210 may transmit the sensor data acquired by using at least one sensor (for example, accelerator sensor, gyro sensor, proximity sensor, heart rate sensor, an electrocardiogram sensor, a pulse sensor, or the like) to the first external electronic device 1220. According to the embodiment of the present disclosure, the electronic device 1210 may receive the sensor data request independent of the receiving of the audio data from the first external electronic device 1220 and acquire the sensor data and transmit the acquired sensor data to the first external electronic device 1220.

In operation 1271, according to various embodiments of the present disclosure, the first external electronic device 1220 may stream the audio data to the electronic device 1210. According to the embodiment of the present disclosure, the first external electronic device 1220 may analyze the sensor data received from the electronic device 1210. For example, the first external electronic device 1220 may use the sensor data to acknowledge whether a specific situation (or specific condition) occurs. When the preset specific situation does not occur, the first external electronic device may stream the audio data to the electronic device 1210. For example, after the operation 1259, the first external electronic device 1220 may continuously stream the audio data to the electronic device 1210.

In operation 1273, according to various embodiments of the present disclosure, the first external electronic device 1220 may transmit the sensor data request to the electronic device 1210. For example, the first external electronic device 1220 may continuously or periodically transmit the sensor data request to the electronic device 1210.

In operation 1275, according to various embodiments of the present disclosure, the electronic device 1210 may transmit the sensor data to the first external electronic device 1220 in response to the sensor data request. For example, after receiving the sensor data request, the electronic device 1210 may transmit the sensor data to the first external electronic device 1220 before receiving a signal for stopping a transmission of a separate sensor data. For example, the electronic device 1210 may receive an instruction to stop the transmission of the sensor data from the user or the first external electronic device 1220 or transmit the sensor data to the first external electronic device 1220 before the link connection to the first external electronic device 1220 is broken.

According to various embodiments of the present disclosure, the electronic device 1210 may transmit the acquired sensor data to the first external electronic device 1220 or transmit the analysis information of the acquired sensor data. For example, when the electronic device 1210 requests the sensor data for sensing the drowsy driving from the first external electronic device 1220, the electronic device 1210 may transmit the sensor data acquired to determine the head movement of the user to the first external electronic device 1220 or transmit the information for determining whether the user drives while drowsy based on the acquired sensor data to the first external electronic device 1220.

According to the embodiment of the present disclosure, the electronic device 1210 may use other protocols in addition to the protocol associated with audio such as A2DP and HFP to transmit the data acquired by the sensor to the first external electronic device 1220 or the second external electronic device 1230. For example, the electronic device 1210 may configure a separate protocol in a service discovery protocol to transmit data.

According to the embodiment of the present disclosure, the electronic device 1210 and the first external electronic device 1220 may use a Bluetooth (BT) protocol, or the like to communicate data and the respective protocols may configure a separate communication channel.

In operation 1277, according to various embodiments of the present disclosure, the first external electronic device 1220 may request the specific situation on the basis of the sensor data received from the electronic device 1210. For example, when the electronic device 1210 is the auditory device that the user wears, the first external electronic device 1220 may determine whether the user drives while drowsy on the basis of the sensor data received from the electronic device 1210. For example, the first external electronic device 1220 may determine the movement of the user on the basis of the sensor data. For example, the first external electronic device 1220 may determine that the user drives while drowsy if it is determined that the user's head suddenly moves.

According to various embodiments of the present disclosure, the first external electronic device 1220 may receive the information on the occurrence of the specific situation from the electronic device 1210. For example, the first external electronic device 1220 may receive the information on whether the user drives while drowsy from the electronic device 1210. The first external electronic device 1220 may use the information received from the electronic device 1210 to immediately acknowledge the occurrence of the specific situation without separately analyzing data.

In operation 1281, according to various embodiments of the present disclosure, the first external electronic device 1220 may transmit instructions or data corresponding to the sensed situations to the electronic device 1210. For example, when the electronic device 1210 is the auditory device and the second external electronic device 1230 is the control device for the vehicle, if the first external electronic device 1220 senses that the user drives while drowsy, the first external electronic device 1220 may transmit an instruction for outputting an alarm sound or an instruction for generating vibration to the electronic device 1210. According to the embodiment of the present disclosure, the first external electronic device 1220 may transmit the audio signal of the alarm sound to the electronic device 1210 along with the instruction for outputting the alarm sound. The electronic device 1210 may output the alarm sound or generate the vibration in response to the instructions or the data received from the first external electronic device 1220.

In operation 1283, according to various embodiments of the present disclosure, the first external electronic device 1220 may transmit instructions or data corresponding to the sensed situations to the second external electronic device 1230. For example, when the electronic device 1210 is the auditory device and the second external electronic device 1230 is the control device for the vehicle, if the first external electronic device 1220 senses that the user drives while drowsy, the first external electronic device 1220 may transmit an instruction for outputting an alarm sound or an instruction for stopping a vehicle to the second external electronic device 1230. The second external electronic device 1230 may output the alarm sound or stop the vehicle in response to the instructions or the data received from the first external electronic device 1220.

According to various embodiments of the present disclosure, the electronic device 1210, the first external electronic device 1220, the second external electronic device 1230, and a third external electronic device (not illustrated) may be operated by interworking with one another. For example, the second external electronic device 1230 may be linked to the third external electronic device. For example, the network to which the electronic device 1210 (for example, auditory device), the first external electronic device 1220 (for example, mobile terminal), the second external electronic device (for example, home gateway), and the third external electronic device (for example, home appliances (for example, TV, lamp, or the like)) are connected may be formed. For example, when the auditory device sequentially transmits the gesture information received from the user to the mobile terminal, the home gateway, and the lamp, and thus the operation of the lamp may be controlled using the auditory device. For example, when the auditory device uses the sensor to sense a double tap gesture of a user, the auditory device may transmit the sensed gesture information to the mobile terminal. The mobile terminal may transmit the information on the gesture to the home gateway and the home gateway may transmit the gesture information to the lamp. For example, when the double tap gesture is set as an input for turning on a lamp, the lamp may be turned on in response to the received gesture information. For example, when a gesture drawing a specific pattern using the head movement of the user wearing the auditory device is set as an input for turning off the lamp, if the gesture information received by the lamp through the auditory device, the mobile terminal, and the home gateway corresponds to the head movement of the user, the lamp may be turned off. According to various embodiments of the present disclosure, the third external electronic devices connected to the second external electronic device (for example, home gateway) may include various home appliances.

According to various embodiments of the present disclosure, the second external electronic device 1230 or the third external electronic device directly or indirectly connected to the electronic device 1210 may be controlled using the electronic device 1210 (for example, auditory device) or the functions associated with the second external electronic device 1230 or the third external electronic device may be provided.

Figure 13:
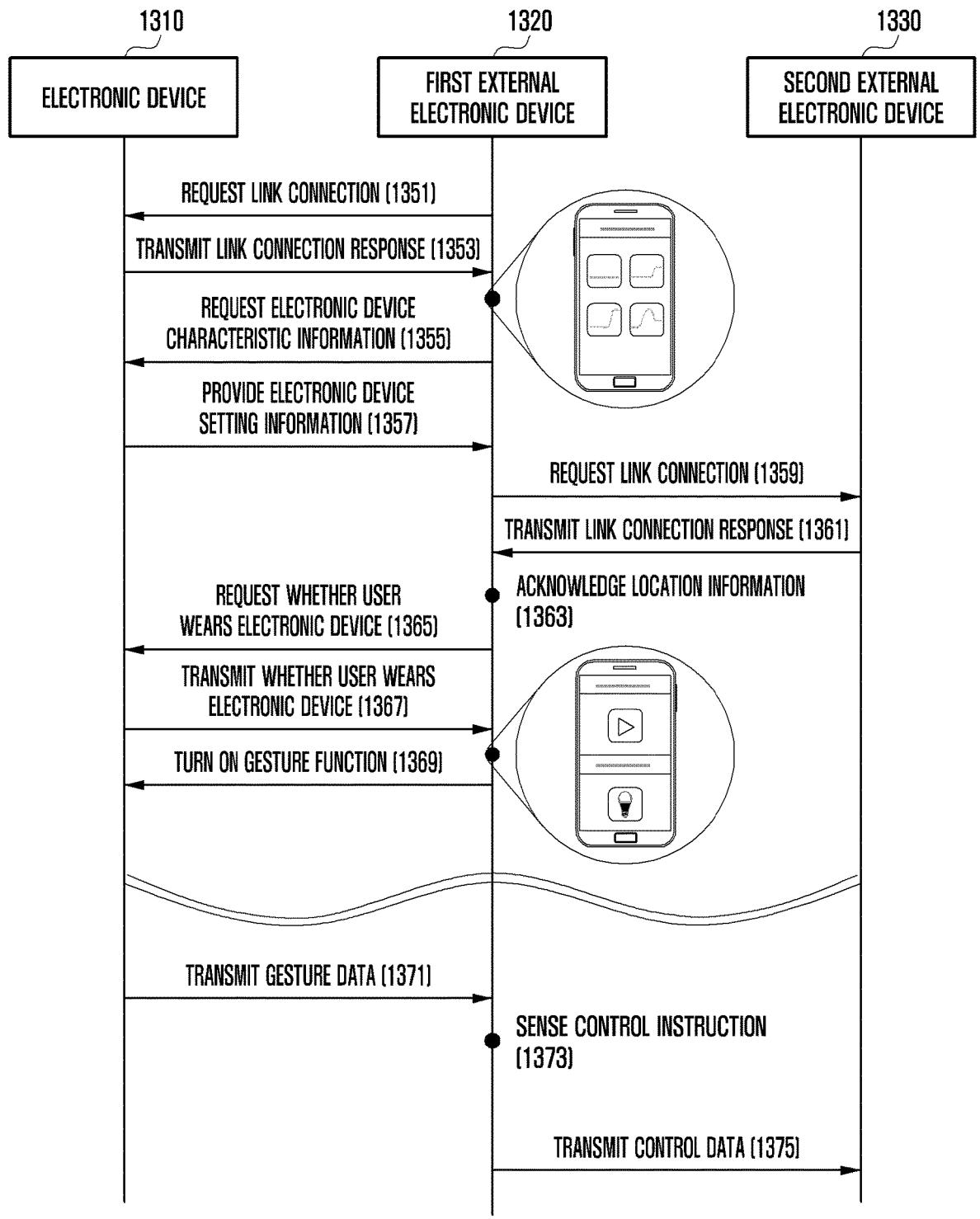
FIG. 13 illustrates the signal flow of the electronic device and external electronic devices according to various embodiments of the present disclosure.

FIG. 13 is a diagram illustrating the signal flow of the electronic device and external electronic devices according to various embodiments of the present disclosure.

In operation 1351, according to various embodiments of the present disclosure, a first eternal electronic device (for example, mobile terminal) 1320 may transmit the link connection request to an electronic device (for example, auditory device) 1310. The first external device 1320 may request the link connection to the preset device or the electronic device 1310 selected depending on the input of the user among the link connectable peripheral devices. For example, when the link connectable auditory device is present around the first external electronic device 1320, the first external electronic device 1320 may transmit the link connection request to the auditory device. According to the embodiment of the present disclosure, the link connection process is performed, and thus the electronic device 1310 and the first external electronic device 1320 may be paired.

In operation 1353, according to various embodiments of the present disclosure, the electronic device 1310 may transmit the link connection response to the first external electronic device 1320. For example, the electronic device 1310 may transmit the link connection response accepting the link connection to the first external electronic device 1320 in response to the link connection request.

In operation 1355, according to various embodiments of the present disclosure, the first external electronic device 1320 may request characteristic information to the electronic device 1310. For example, the first external electronic device 1320 may request a kind, a set value, a support function, or the like of the electronic device 1310. For example, when the electronic device 1310 is the auditory device, the first external electronic device 1320 may request fitting parameter model information to the electronic device 1310.

In operation 1357, according to various embodiments of the present disclosure, the electronic device 1310 may transmit the setting information to the first external electronic device 1320 in response to the characteristic information request. For example, the electronic device 1310 may transmit device information of the electronic device 1310, a support function, a current set value, or the like to the first external electronic device 1320.

According to the embodiment of the present disclosure, the first external electronic device 1320 may display the user interface for changing the setting of the electronic device 1310. For example, when the electronic device 1310 is the auditory device, the first external electronic device 1320 may display the user interface for changing the fitting parameter model of the auditory device. The first external electronic device 1320 may change the setting of the electronic device 1310 using the selected set value (for example, selected fitting parameter model) depending on the input of the user received through the user interface.

In operation 1359, according to various embodiments of the present disclosure, the first external electronic device 1320 may request the link connection to the second external electronic device (for example, router, home electronic device, or the like) 1330. For example, the first external electronic device 1320 may be selected depending on the preset reference or may select the specific device selected depending on the input of the user as the second external electronic device 1330. The external electronic device 1320 may transmit the link connection request to the selected second external electronic device 1330.

In operation 1361, according to various embodiments of the present disclosure, the second external electronic device 1330 may transmit the link connection response to the first external electronic device 1320 in response to the link connection request. According to the embodiment of the present disclosure, the link connection process is performed, and thus the first external electronic device 1320 and the second external electronic device 1330 may be paired.

In operation 1363, according to various embodiments of the present disclosure, the first external electronic device 1320 may acknowledge the location information of the user. For example, when the first external electronic device 1320 is connected to the second external electronic device 1330 present at the preset location, the first external electronic device 1320 may acknowledge the location of the user based on the location of the second external electronic device 1330. For example, when the second external electronic device 1330 is an access point located in a house, the first external electronic device 1320 may recognize that the user is present at a specific location in a house in which the second external electronic device (AP) 1330 is present.

In operation 1365, according to various embodiments of the present disclosure, the first external electronic device 1320 may request a state on whether the user wears the electronic device 1310 to the electronic device 1310. For example, when the electronic device 1310 is the auditory device, the first external electronic device 1320 may request the state on whether the user wears the electronic device 1310 to the electronic device 1310 to acknowledge whether the electronic device 1310 is put on the user's body.

In operation 1367, according to various embodiments of the present disclosure, the electronic device 1310 may transmit the state on whether the user wears the electronic device 1310 to the first external electronic device 1320. For example, the electronic device 1310 may include at least one sensor. The electronic device 1310 may determine whether the user wears the electronic device 1310 based on the data acquired by the sensor. Alternatively, the electronic device 1310 may also determine whether the user wears the electronic device 1310 depending on the input of the user.

According to various embodiments of the present disclosure, the electronic device 1310 may transmit whether the user wears the electronic device 1310 to the first external electronic device 1320 in response to the request for the state on whether the user wears the electronic device 1310.

In operation 1369, according to various embodiments of the present disclosure, the first external electronic device 1320 may activate the gesture function of the electronic device 1310. For example, the first external electronic device 1320 may activate the gesture function of the electronic device 1310 while the user wears the electronic device 1310.

According to the embodiment of the present disclosure, the first external electronic device 1320 may display the user interface that may turn on-off the gesture function. The first external electronic device 1320 may display the state on whether the user wears the electronic device. If the first external electronic device 1320 receives the input for activating the gesture function of the electronic device 1310 from the user, the first external electronic device 1320 may transmit an input for activating a gesture function to the electronic device 1310.

In operation 1371, according to various embodiments of the present disclosure, the electronic device 1310 may transmit the gesture data to the first external electronic device 1320. According to the embodiment of the present disclosure, the electronic device 1310 may collect the sensor data in response to the instruction for activating the gesture function. For example, the electronic device 1310 may recognize the user's gesture on the basis of the data acquired by the sensor. For example, the electronic device 1310 may use the accelerator sensor to recognize the double tap gesture of the user. For example, when the electronic device 1310 is the auditory device, the auditory device may recognize the gesture of doubly tapping the auditory device that the user is wearing. For example, the electronic device 1310 may use the sensor to recognize the movement of the user's body (for example, the head movement of the user who is wearing the auditory device, or the like) as the gesture.

According to the embodiment of the present disclosure, the electronic device 1310 may transmit the data for the input of the user received through the input unit (for example, button, key, or the like) to the first external electronic device 1320. For example, when a button input frequency, a scheme, or the like of the electronic device 1310 is mapped to the corresponding control instruction words, the electronic device 1310 may transmit the data for the control instruction word corresponding to the received input to the first external electronic device 1320.

According to the embodiment of the present disclosure, the electronic device 1310 may transmit the data for the signal input through the microphone to the first external electronic device 1320. For example, if the electronic device 1310 receives a voice command from the user, the received voice command or the data corresponding thereto may be transmitted to the first external electronic device 1320.

In operation 1373, according to various embodiments of the present disclosure, the first external electronic device 1320 may sense a control instruction. For example, the first external electronic device 1320 may recognize the gesture received from the electronic device 1310, the input data, and the control instruction corresponding to the voice instruction. For example, the first external electronic device 1320 may acknowledge the instruction for controlling the second external electronic device 1330 on the basis of the data received from the electronic device 1310. For example, when the second external electronic device 1330 is the lamp, if the first external electronic device 1320 receives the double tap gesture from the electronic device 1310, the first external electronic device 1320 may determine whether the double tap gesture is a gesture for performing what operation of the lamp.

In operation 1375, according to various embodiments of the present disclosure, the first external electronic device 1320 may transmit the control data to the electronic device 1330. For example, the first external electronic device 1320 may transmit the control data corresponding to the gesture received from the electronic device 1310 to the second external electronic device 1330. For example, when the second external electronic device 1330 is the lamp and the gesture for turning on the lamp is the double tap, the first external electronic device 1320 may receive the double tap gesture from the electronic device 1310 to transmit the control data for turning on the lamp to the second external electronic device 1330.

For example, when the electronic device 1319 is the auditory device and the second external electronic device 1330 is TV, the gesture that the auditory device senses using the sensor may correspond to a turn on-off of TV or a control operation of a volume. For example, when the auditory device senses the double tap gesture and transmits the gesture information to the mobile terminal, TV may receive the information on the double tap gesture through the mobile terminal. TV may turn up a volume in response to the received double tap gesture. For example, when the auditory device senses a triple tap gesture and transmits the gesture information to the mobile terminal, TV may receive information on the triple tap gesture from the mobile terminal. In this case, TV may turn down a volume in response to the triple tap gesture.

In the same scheme, the operations of the electronic devices connected to the auditory device and the mobile terminal such as controlling a temperature of an air conditioner, opening or closing a door lock, controlling a volume of an audio system, and controlling an operation of a washing machine may be controlled using the gesture sensed by the auditory device.

According to various embodiments of the present disclosure, the gesture sensed by the electronic device 1310 may be mapped to other operations depending on the connected second external electronic device 1330 and the gesture of the electronic device 1310 corresponding to the operation of the second external electronic device 1330 may be set or changed depending on the input of the user.

According to various embodiments of the present disclosure, the electronic device 1310 (for example, auditory device) may control the operation of the second external electronic device 1330 connected to the electronic device 1310 and the first external electronic device 1320 depending on the input received from the user. For example, when the electronic device 1310 is the auditory device and the first external electronic device 1320 is the mobile terminal, the second external electronic device 1330 connected to the first external electronic device 1320 may be controlled on the basis of the data acquired by the button of the auditory device or the sensor. According to various embodiments of the present disclosure, the second external electronic device 1330 that may be controlled by the electronic device 1310 may include a wearable device such as a smart watch (band), various home appliances (TV, lamp, washing machine, air conditioner, or the like) and all kinds of electronic devices may be all applied without being limited thereto. According to the embodiment of the present disclosure, even when the electronic device 1310 acquires the same gesture data, or the like, the first external electronic device 1320 may generate other control instructions depending on the second external electronic device 1330 connected and transmit the generated control instructions to the second external electronic device 1330.

Figure 14:
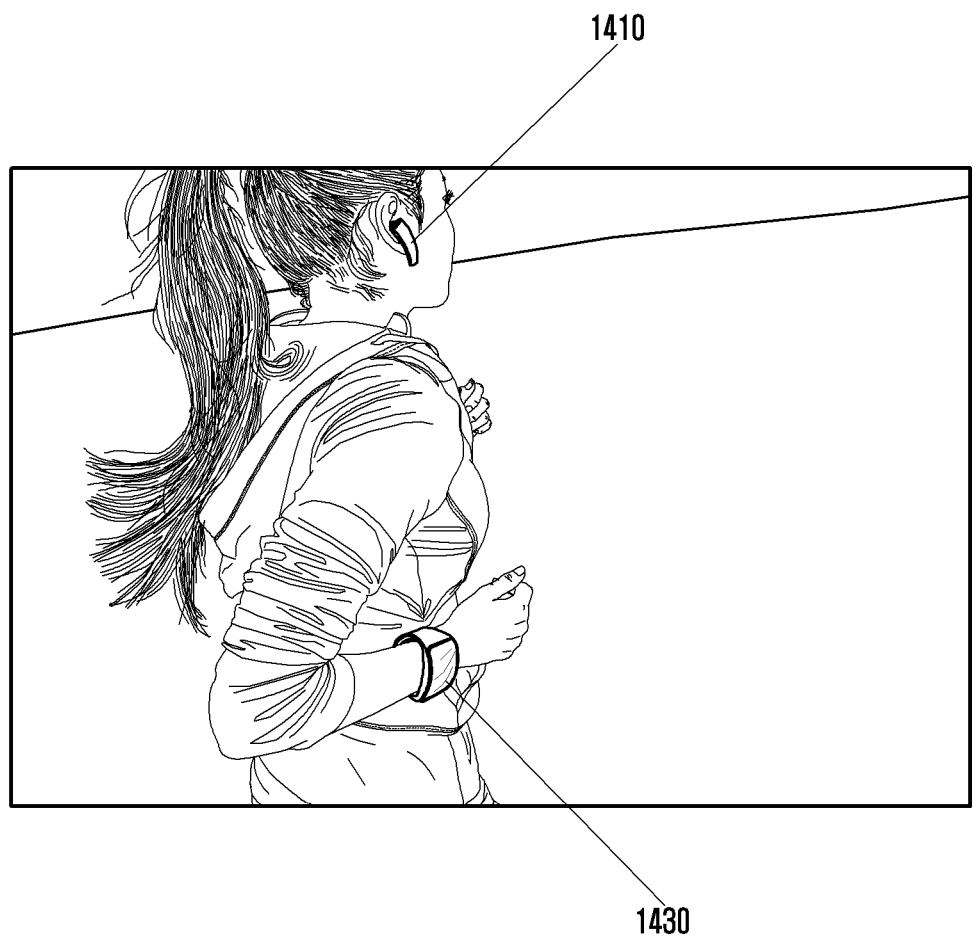
FIG. 14 illustrates an operation of the electronic device according to various embodiments of the present disclosure.

FIG. 14 is a diagram for describing an operation of the electronic device according to various embodiments of the present disclosure.

Hereinafter, an interworking operation of an electronic device 1410, a first external electronic device (not illustrated), and a second external electronic device 1430 is described under the assumption that the electronic device 1410 is the auditory device, the first external electronic device is the mobile terminal, the second external electronic device 1430 is the wearable device (for example, smart band), but the embodiment of the present disclosure is not limited thereto.

According to the embodiment of the present disclosure, the auditory device 1410 may include a portion configured to be detachably coupled with a part of the user's ear. That is, the auditory device 1410 may be put on a user's ear.

The smart band 1430 may be put on a part of the user's body. For example, the smart band 1430 may be put on a user's hand.

The auditory device 1410 may be connected to the smart band 1430. For example, the auditory device 1410 may be connected to the mobile terminal and the smart band 1430 may be connected to the mobile terminal.

According to the embodiment of the present disclosure, the smart band 1430 may measure biometric information of a user while the user is working out. For example, the smart band 1430 may measure a heart rate, an electrocardiogram, a pulse, a body temperature, a step count, or the like of a user. In this case, to supplement the function of the smart band 1430, the auditory device 1410 may collect the sensor data separately from the external device. For example, the auditory device 1410 may use at least one sensor to measure at least a part of the heart rate, the electrocardiogram, the pulse, the body temperature, and the step count of the user.

According to various embodiments of the present disclosure, the auditory device 1410 may transmit the acquired sensor data to the smart band 1430. According to the embodiment of the present disclosure, the auditory device 1410 and the smart band 1430 may transmit and receive data or instructions through the mobile terminal. For example, the auditory device 1410 may transmit the acquired sensor data to the mobile terminal and the mobile terminal may transmit the received sensor data or the information extracted from the sensor data to the smart band 1430.

According to various embodiments of the present disclosure, if it is acknowledged that the mobile terminal is connected to the smart band 1430, the mobile terminal may provide the user interface (for example, application, or the like) for controlling the operation of the auditory device 1410 associated with the smart band 1430. For example, the mobile terminal may perform a control to perform the function associated with the smart band 1430 using the auditory device 1410. For example, when the user who is wearing the auditory device 1410 wears the smart band 1430 including a health function, the mobile terminal may sense the connection of the smart band and display the fact that a function for a new function (for example, providing calorie information) associated with the health function may be used on an application controlling the auditory device 1410. When the mobile terminal receives an input for using a new function from a user, a control to measure calorie consumption of the user using the sensor (for example, accelerator sensor) of the auditory device 1410 and the sensor (for example, accelerator sensor) of the smart band 1430 may be performed. For example, the mobile terminal may request the sensor data to the auditory device 1410 to support the new function (for example, calorie measurement) depending on the input of the user. The mobile terminal may transmit the sensor data received from the auditory device 1410 to the smart band 1430. For example, to measure the calorie, the smart band 1430 may simultaneously use the sensor data measured by the auditory device 1410 and the sensor data measured by the smart band 1430. The smart band 1430 may use both of the sensor data of the auditory device 1410 and the smart band 1430 to increase the accuracy of the measurement.

According to the embodiment of the present disclosure, the auditory device 1410 may use the sensors (for example, accelerator sensor, gyro sensor, biometric sensor, proximity sensor, or the like) to measure physical or physiological information (for example, heart rate, body temperature, step count, head movement, or the like of the user). For example, if the auditory electronic device is used, reliability of data may be higher than the case in which the biometric data of the user is collected by only the smart band 1430.

For example, in the case of a falling (tumble) accident, the information on the head movement of the user may be more required than the information on a movement of other bodies of the user. For example, it may be difficult to accurately understand the body information of the user only by the information acquired by the wearable device 1430 that is put on a user's wrist, or the like. According to various embodiments of the present disclosure, when the user wears the auditory device 1410, the auditory device 1410 and the wearable device 1430 are operated by interworking with each other (for example, sharing the sensor data), such that it is possible to accurately determine the state or movement of the user. According to various embodiments of the present disclosure, the mobile terminal may use the information acquired by the auditory device 1410 or the wearable device to store and analyze statistics for the errors of the sensor data collected by each device.

According to the embodiment of the present disclosure, the smart band 1430 may directly transmit the measured results to the auditory device 1410 or transmit the measured results to the auditory device 1410 through the mobile terminal. The auditory device 1410 may output the received measurement results to provide the body measurement results to the user in real time.

According to the embodiment of the present disclosure, the auditory device 1410 may measure exercise information of the body using the sensor. For example, when the auditory device 1410 is put on the user's head (ear), the auditory device 1410 may detect the head movement of the user to be used to calculate the exercise information of the user's body.

According to the embodiment of the present disclosure, the auditory device 1410 may use the sensor to determine whether the user wears the auditory device 1410. The auditory device 1410 may transmit whether the user wears the auditory device 1410 to the mobile terminal. The mobile terminal may determine whether the function associated with the smart band 1430 is provided depending on whether the user wears the auditory device 1410. For example, if it is determined that the user wears the auditory device 1410, the mobile terminal may perform a control to perform the function of interworking the auditory device 1410 with the smart band 1430.

According to the embodiment of the present disclosure, the auditory device 1410 may be connected to the mobile terminal and the mobile terminal may be connected to various medical instruments. For example, the user information measured by the auditory device 1410 may be transmitted to the medical instruments. Alternatively, the operations of the medical instruments may be controlled depending on the gesture sensed by the auditory device 1410.

Figure 15:
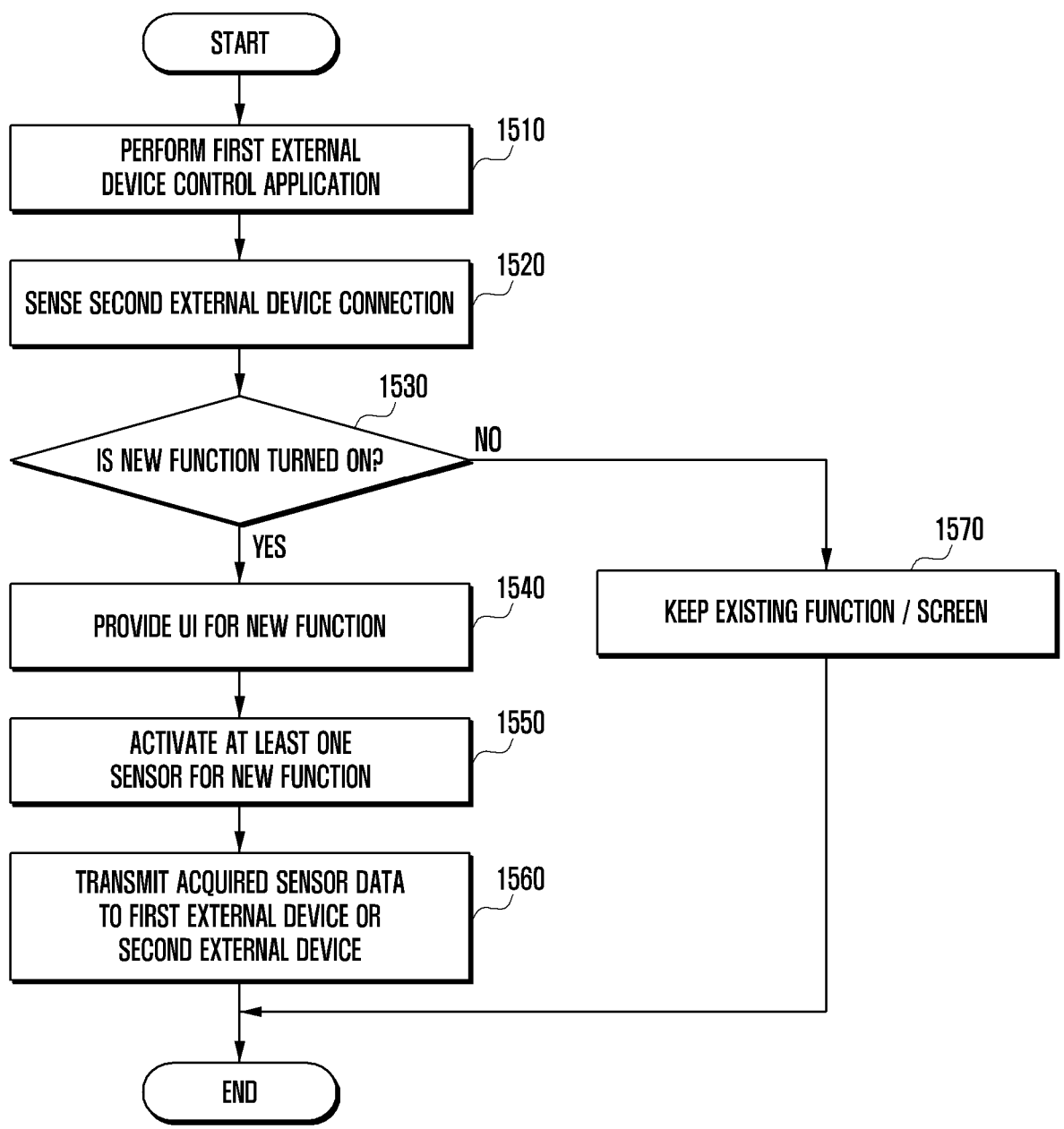
FIG. 15 illustrates a flow chart for operating an electronic device according to various embodiments of the present disclosure.

FIG. 15 is a flow chart of the method for operating an electronic device according to various embodiments of the present disclosure.

In operation 1510, according to various embodiments of the present disclosure, the electronic device (for example, mobile terminal) may execute an application for controlling the first external device (for example, auditory device). For example, the electronic device may include an auditory device manager program for controlling the first external device.

In operation 1520, according to various embodiments of the present disclosure, the electronic device may sense the connection of the second external device (for example, wearable device). For example, the electronic device may be wirelessly connected to the second external device.

In operation 1530, according to various embodiments of the present disclosure, the electronic device may determine whether a new function is activated. For example, when the electronic device is connected to the second external device, the electronic device may acknowledge the function associated with the second external device. The electronic device may display the new function associated with the second external device on the display. According to the embodiment of the present disclosure, the electronic device may receive an input on whether to perform the function associated with the first external device and the second external device from the user. For example, the electronic device may provide the function selected depending on the input of the user among the functions displayed on the display. For example, the electronic device may determine whether to perform the new functions depending on the input of the user. The electronic device may perform operation 1540 when performing the new function. The electronic device may perform operation 1570 when not performing the new function.

In the operation 1540, according to various embodiments of the present disclosure, the electronic device may provide a user interface for a new function. For example, the electronic device may provide a user interface associated with newly performed functions when receiving an input for using a new function from the user. The electronic device may receive an input for controlling a function to be performed from a user through the user interface.

In the operation 1550, according to various embodiments of the present disclosure, the electronic device may activate at least one sensor for a new function. According to the embodiment of the present disclosure, the electronic device may request the sensor data to the first external device. For example, the electronic device may request the sensor data corresponding to the function associated with the second external device to the first external device.

For example, when the second external device is a device (for example, smart band, smart watch, health server, medical device, or the like including a health function for supporting a function of measuring a user's body), the electronic device may request the sensor data measuring the user's body to the first external device. For example, the first external device may activate at least one sensor in response to the request of the electronic device. For example, the first external device may transmit data obtained by measuring the heart rate, the electrocardiogram, the pulse, the step count, or the like of the user using the sensor to the electronic device. For example, the first external device may the information of the user acquired using the sensor to the electronic device.

For example, when the second external device is a device (for example, home appliances such as TV and lamp) requiring the control instruction of the user, the electronic device may request the gesture information to the first external device. The first external device may transmit the gesture information of the user acquired using the sensor to the electronic device, in response to the request of the electronic device. For example, the first external device may sense the movement of the user's body, the gesture of the user touching (tapping) the first external device, or the like and transmit the information on the sensed gesture to the electronic device.

In operation 1560, according to various embodiments of the present disclosure, the electronic device may transmit the acquired sensor data to the second external device. For example, the electronic device may transmit the sensor data received from the first external device or the information extracted from the sensor data to the second external device.

For example, when the second external device is a device for supporting a body measurement of a user, the electronic device may transmit the sensor data obtained by allowing the first external device to measure the user's body to the second external device. The second external device may use both of the sensor data measured by the first external device and the sensor data measured by the second external device to more accurately measure and analyze the user's body.

For example, when the second external device is a device requiring a control instruction of a user, the electronic device may transmit the sensor data received from the first external device to the second external device. The electronic device may transmit an operation instruction corresponding to the sensor data received from the first external device to the second external device. The second external device may perform the operation corresponding to the received gesture information.

In operation 1570, according to various embodiments of the present disclosure, the electronic device may keep the existing function or screen. For example, if the electronic device is connected to only the first external device, when the audio data are transmitted to the first external device, the audio data may be continuously transmitted to the first external device. For example, when the electronic device displays the user interface for controlling the first device, the user interface for controlling the first device may be continuously displayed.

Figure 16:
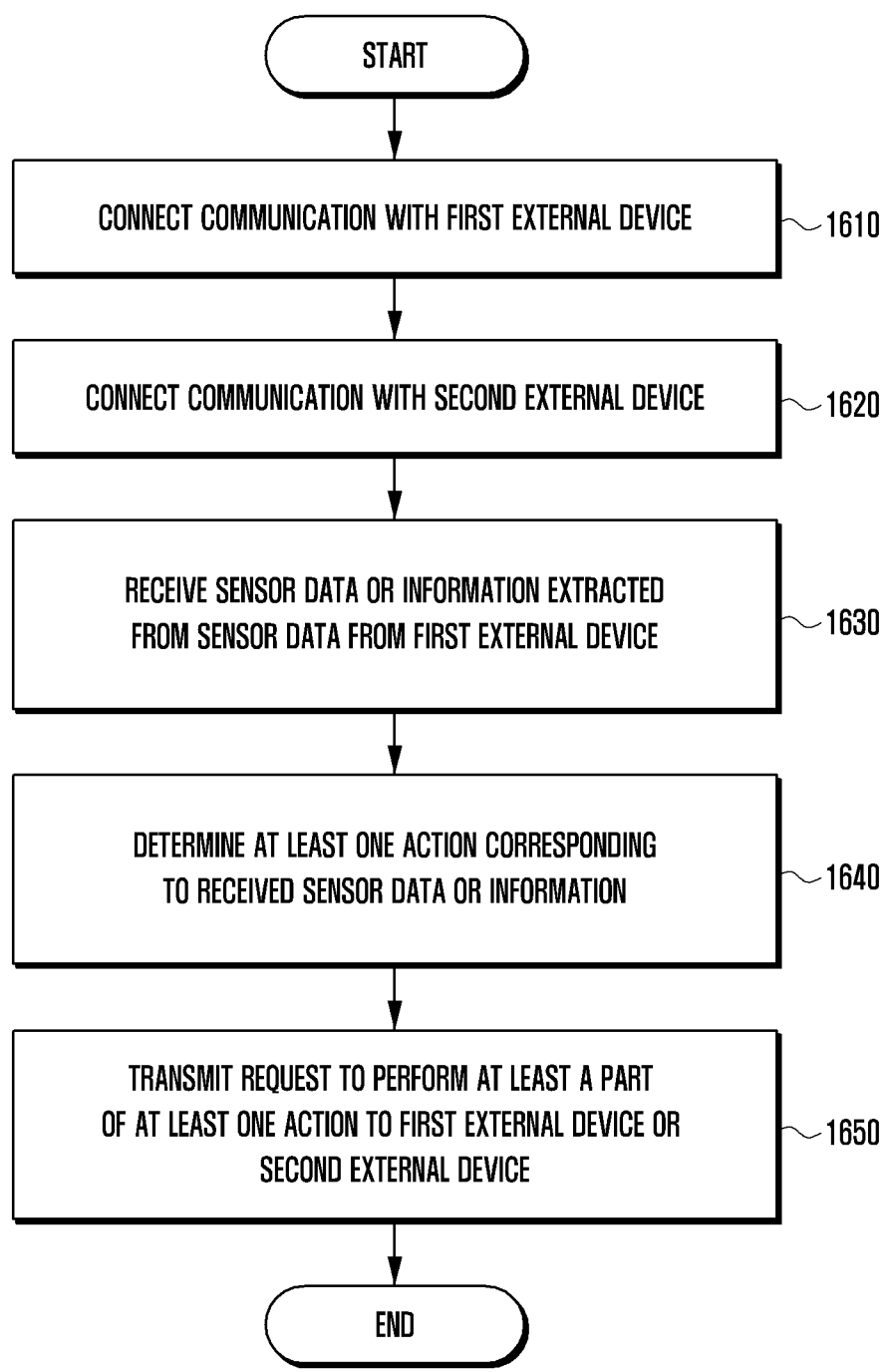
FIG. 16 illustrates a flow chart for operating an electronic device according to various embodiments of the present disclosure.

FIG. 16 is a flow chart of a method for operating an electronic device according to various embodiments of the present disclosure.

In operation 1610, according to various embodiments of the present disclosure, the electronic device (for example, mobile terminal) may connect communication with the first external device (for example, auditory device). For example, the electronic device may be connected to the first external device by the first communication method (for example, NFMI, AoBLE, BT, or the like).

In operation 1620, according to various embodiments of the present disclosure, the electronic device may connect the communication with the second external device (for example, wearable device). For example, the electronic device may be connected to the second external device by the second communication method (for example, WiFi).

According to various embodiments of the present disclosure, even when the first external device and the second external device support only different communication methods, the first external device and the second external device may transmit and receive data and/or information through the electronic device that may communicate with the first external device and the second external device.

According to various embodiments of the present disclosure, the electronic device may receive the information on the second external device or the information associated with at least one action from the second external device. The electronic device may perform the electronic device or at least one action to be requested to the first external device or the second external device, on the basis of at least a part of the information received from the second external device.

In operation 1630, according to various embodiments of the present disclosure, the electronic device may receive the sensor data or the information extracted from the sensor data from the first external device. For example, the first external device may acquire the sensor data in response to the sensor data request of the electronic device. The first external device may extract specific information from the acquired sensor data or generate specific information on the basis of the sensor data. The electronic device may receive the sensor data or the information acquired by the first external device from the first external device.

According to the various embodiments of the present disclosure, the electronic device may request the sensor data to the first external device, in response to the information (for example, information on the second external electronic device, or the like) received from the second external device. According to the embodiment of the present disclosure, the electronic device may request the data acquired by the first external device to the first external device in repose to the information received from the second external device. According to the embodiment of the present disclosure, the electronic device may receive the data acquired by the first external device from the first external device and then receive the information on the second external device from the second external device. According to the embodiment of the present disclosure, the electronic device may be performed on the basis of at least one of the information received from the first external device and the information received from the second external device or may determine at least one action to be requested to the first external device or the second external device. In operation 1640, according to various embodiments of the present disclosure, the electronic device may determine at least one action corresponding to the sensor data or the information received. For example, the at least one action may include at least one of the output of the sound signal, the generation of vibration, the display of the user interface, the execution of the specific function, and the analysis of the data and/or the information. For example, the electronic device may determine at least one operation that may be performed by the first external device or the second external device on the basis of the sensor data.

In operation 1650, according to various embodiments of the present disclosure, the electronic device may transmit a request to perform at least a part of at least one action to the first external device or the second external device. For example, the electronic device may transmit a request to output the alarm sound to the first external device. For example, the electronic device may perform a request to perform a specific operation or a request to stop an operation that is being performed to the second external device.

Figure 17:
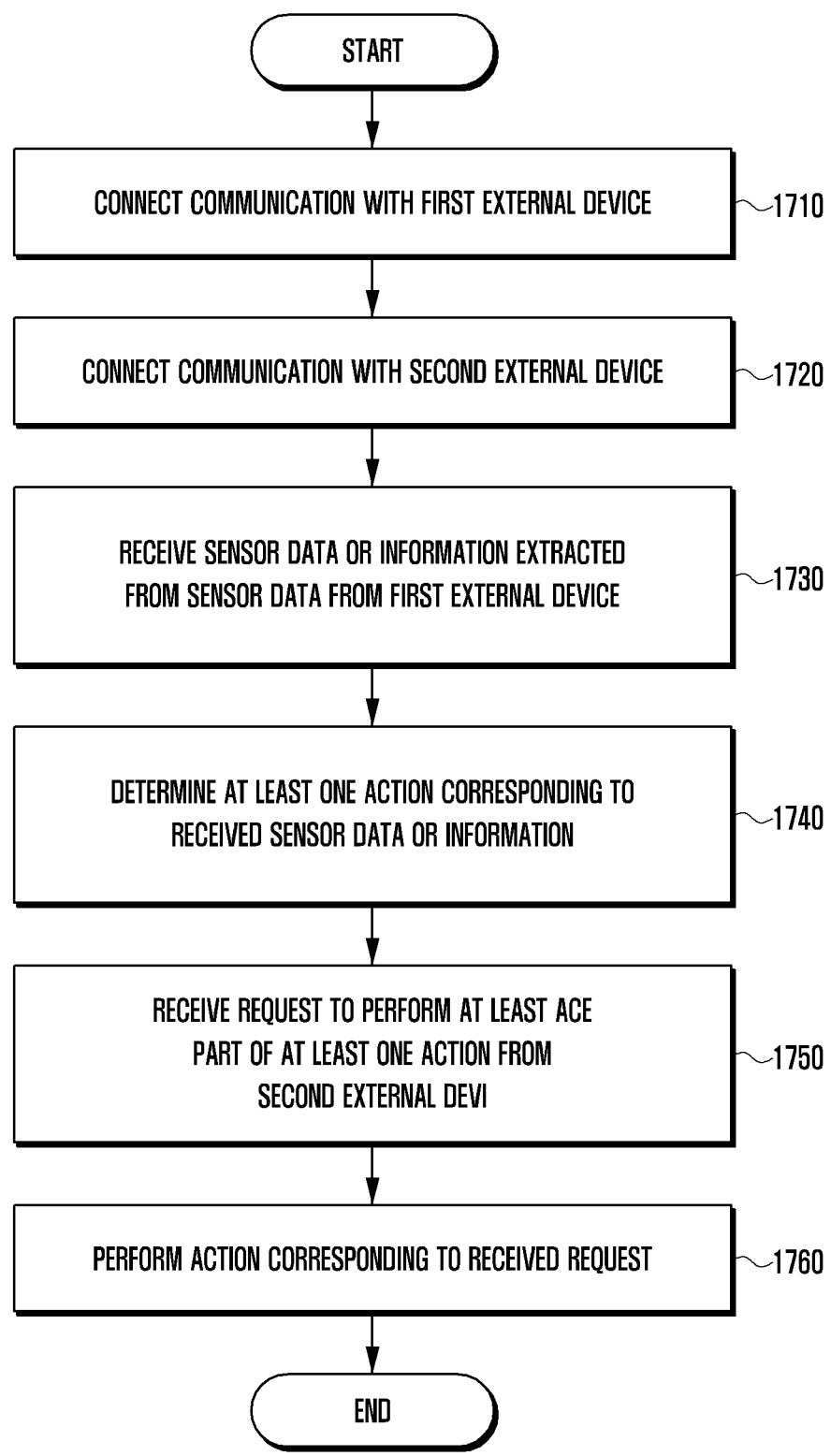
FIG. 17 illustrates a flow chart for operating an electronic device according to various embodiments of the present disclosure.

FIG. 17 is a flow chart of a method for operating an electronic device according to various embodiments of the present disclosure.

In operation 1710, according to various embodiments of the present disclosure, the electronic device (for example, mobile terminal) may connect communication with the first external device (for example, auditory device).

In operation 1720, according to various embodiments of the present disclosure, the electronic device may connect the communication with the second external device (for example, wearable device, or the like). According to various embodiments of the present disclosure, the first external device and the second external device may be connected to the electronic device by different communication methods.

In operation 1730, according to various embodiments of the present disclosure, the electronic device may receive the sensor data or the information extracted from the sensor data from the first external device. For example, the first external device may acquire the sensor data in response to the sensor data request of the electronic device. The first external device may extract specific information from the acquired sensor data or generate specific information on the basis of the sensor data. The electronic device may receive the sensor data or the information acquired by the first external device from the first external device.

According to the embodiment of the present disclosure, the electronic device may transmit the sensor data or the information received from the first external device to the second external device. The second external device may receive the sensor data or the information received from the first external device from the electronic device. According to the embodiment of the present disclosure, the first external device may transmit the sensor data or the information acquired by the first external device to the electronic device or the second external device that is connected to the first external device. For example, the first external device may directly transmit the sensor data or the information to the electronic device or the second external device that communicates therewith or may transmit the sensor data or the information to the second external device through the electronic device. In operation 1740, according to various embodiments of the present disclosure, the electronic device may determine at least one action corresponding to the sensor data or the information received. For example, the at least one action may include at least one of the output of the sound signal, the generation of vibration, the display of the user interface, the execution of the specific function, and the analysis of the data and/or the information. For example, the electronic device may determine at least one operation that may be performed by the first external device or the second external device on the basis of the sensor data.

In operation 1750, according to various embodiments of the present disclosure, the electronic device may receive a request to perform at least a part of at least one action from the second external device.

According to the embodiment of the present disclosure, the second external device may monitor the data or the information received from the electronic device. The second external device may transmit the request to perform at least a part of the actions to the electronic device on the basis of at least a part of the data or the information received from the electronic device.

According to the embodiment of the present disclosure, the second external device may directly receive the sensor data or the information from the first external device. The second external device may monitor the sensor data or the information received from the first external device from the first external device. The second external device may transmit the request to perform at least a part of the actions to the electronic device on the basis of at least a part of the data or the information received from the first external device. According to various embodiments of the present disclosure, the second external device may transmit the request to perform at least a part of the actions to the electronic device or the first external device on the basis of at least a part of the received data or information.

In operation 1760, according to various embodiments of the present disclosure, the electronic device may perform the action corresponding to the received request. For example, the electronic device may perform at least a part of the at least one action in response to the received request. For example, the electronic device may output the sound signal or generate the vibration. For example, the electronic device may transmit the acquired sensor data to the first external device or the second external device in response to the received request. For example, the electronic device may transmit the instruction for controlling the operation of the first external device to the first external device in response to the received request.

Figure 18:
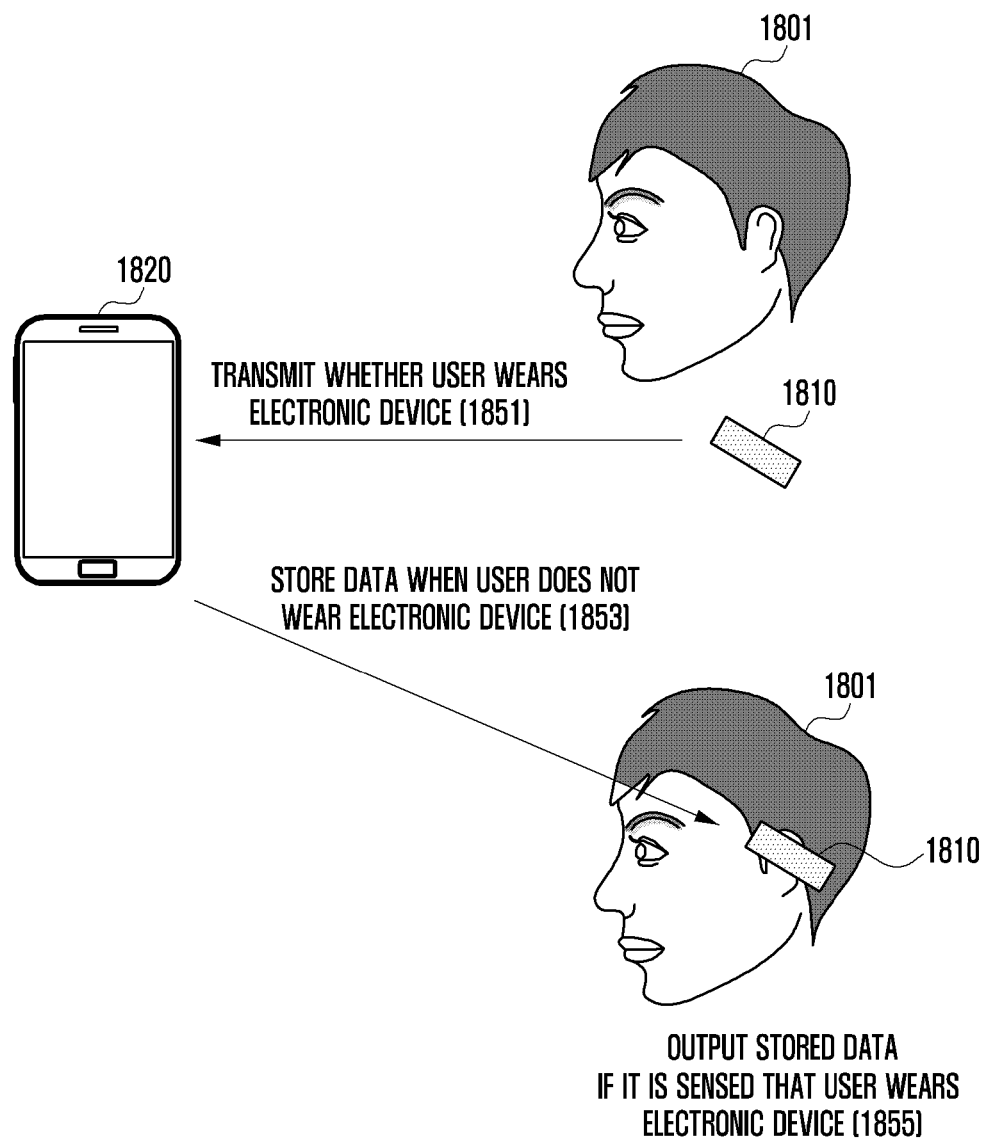
FIG. 18 illustrates the operation of the electronic device according to various embodiments of the present disclosure.

FIG. 18 is a diagram for describing the operation of the electronic device according to various embodiments of the present disclosure.

According to the embodiment of the present disclosure, in operation 1851, the electronic device 1810 may use the sensor unit to determine whether a user 1801 wears the electronic device 1810. For example, the electronic device 1810 may transmit the information on whether the user 1801 wears the electronic device 1810 to an external electronic device 1820 (for example mobile terminal, or the like). According to the embodiment of the present disclosure, the electronic device 1810 may use the sensor to acquire data associated with at least a part of a state, a pose, and/or a movement of a user's body. For example, when the electronic device 1810 is the auditory device that is put on the user's head, the electronic device 1810 may acquire the data on the head movement of the user using the sensor and determine whether the user wears the electronic device on the basis of the acquired data.

In operation 1853, according to various embodiments of the present disclosure, the external electronic device 1820 may collect a sound using a microphone of the external electronic device 1820 instead of the electronic device 1810 when the user 1801 does not wear the electronic device 1810. The external electronic device 1820 may store the collected sound. For example, the external electronic device 1820 may record an outside sound.

In operation 1855, according to various embodiments of the present disclosure, the electronic device 1810 may output data stored in the external electronic device 1820 in the state in which the user 1801 does not wear the electronic device 1810. For example, when the user 1801 wears the electronic device 1810, the external electronic device 1820 may transmit the recorded sound to the electronic device 1810. When the user 1801 wears the electronic device 1810, the electronic device 1810 may inform the external electronic device 1820 that the user wears the electronic device 1810. If the external electronic device 1820 receives the signal informing that the user 1801 wears the electronic device 1810 from the electronic device 1810, the external electronic device 1820 may transmit the stored data to the electronic device 1810.

According to the embodiment of the present disclosure, the external electronic device 1820 may directly or periodically transmit the stored data to the electronic device 1810 in the state in which the user 1801 does not wear the electronic device 1810. For example, when the user 1801 does not wear the electronic device 1810, the electronic device 1810 may receive and store the data acquired by the external electronic device 1820. If it is sensed that the user 1801 wears the electronic device 1810, the electronic device 1810 may output data received from the external electronic device 1820.

For example, the external electronic device 1820 may transmit the data on the recorded sound to the electronic device 1810. The electronic device 1810 may output a sound corresponding to the data received from the external electronic device 1820.

According to the embodiment of the present disclosure, when the external electronic device 1820 records the sound, the external electronic device 1820 may store at least one of the time information or the sensor information together.

According to various embodiments of the present disclosure, when the user does not wear the electronic device 1810, the external electronic device 1820 records an outside sound and when the user 1801 wears the electronic device 1810, the external electronic device 1820 outputs the recorded sound through the electronic device 1810 to provide a sound generated from the outside to the user 1801 in the state in which the user 1801 does not wear the electronic device 1810.

According to various embodiments of the present disclosure, the method for controlling an electronic device and the operation order of the electronic device are not limited to the operation order disclosed in the present disclosure and drawings, and therefore, the electronic device may individually perform each operation or may be operated by changing some of the operation order.

According to various embodiments of the present disclosure, the method for controlling an operation of an electronic device may include an operation of receiving at least one audio signal from the first external device, an operation of changing the received audio signal to the sound signal and outputting the sound signal through the speaker, an operation of acquiring data associated with at least a part of a state, a pose, and/or a movement of a user's body using at least one sensor, independent of the audio signal, and an operation of transmitting the data and/or the information extracted from the data to the first external device.

According to various embodiments of the present disclosure, the electronic device may change the audio signal to the sound signal corresponding to the preset user information and output it. According to the embodiment of the present disclosure, the user information may include the auditory characteristic information of the user.

According to various embodiments of the present disclosure, the method for controlling an operation of an electronic device may further include an operation of determining whether the user wears the electronic device on the basis of the acquired data and an operation of transmitting the information on which the user wears the electronic device to the first external device.

The at least one sensor may include at least one of the accelerator sensor, the gyro sensor, the proximity sensor, the heart rate sensor, the electrocardiogram sensor, the pulse sensor, and the microphone.

The reception of the audio signal and the transmission of the data and/or the information may be performed using different communication protocols or different communication profiles.

According to various embodiments of the present disclosure, the method for controlling an operation of an electronic device may include an operation of receiving the data associated with at least a part of the state, the pose, and/or the movement of the user's body acquired by the first external device and/or the information extracted from the data from the first external device, an operation of determining at least one action corresponding to the received data and/or information, and an operation of transmitting the request to allow the second external device to perform at least a part of the at least one action to the second external device.

The method for controlling an operation of an electronic device may further include an operation of transmitting another request to allow the first external device to perform at least other parts of the at least one action to the first external device.

The method for controlling an operation of an electronic device may further include an operation of transmitting the audio signal to be output through the first external device to the first external device.

The method for controlling an operation of an electronic device may further include an operation of displaying at least one user interface configured to control the first external device or the second external device on at least a part of the display and an operation of transmitting the request to the second external device on the basis of the input of the user for selecting at least a part of the at least one user interface or transmitting another request to allow the first external device to perform the at least other parts of the at least one action to the first external device.

The at least one action may include at least one of the output of the sound signal, the generation of vibration, the display of the user interface, the execution of the specific function, and the analysis of the data and/or the information.

The method for controlling an operation of an electronic device may include an operation of receiving the data associated with at least a part of the state, the pose, and/or the movement of the user's body acquired by the first external device and/or the information extracted from the data from the first external device, an operation of determining at least one action corresponding to the received data and/or information, an operating of receiving the request to perform the at least one action from the second external device, and an operation of performing at least a part of the at least one action in response to the received request.

The operation of performing at least a part of the at least one action may perform at least one of the output of the sound signal through the speaker of the electronic device, the provision of the vibration through the actuator, or the display of the user interface through the display.

According to various embodiments of the present disclosure, the method for controlling an operation of an electronic device may include an operation of receiving the data associated with at least a part of the state, the pose, and/or the movement of the user's body acquired by the first external device and/or the information extracted from the data from the first external device, and an operation of transmitting the request to allow the second external device to perform at least one operation corresponding to the received data and/or the information to the second external device.

The transmitting operation may include an operation of determining to what extent a part of the user's body moves on the basis of the received data and/or information and an operation of transmitting the request to perform at least one operation to the first external device or the second external device when a part of the user's body moves beyond the preset reference.

The at least one operation may include an operation of outputting a sound beyond a preset size or an operation of generating vibration beyond a preset strength.

The method for controlling an operation of an electronic device may further include an operation of receiving the information on the second external device from the second external device and an operation of determining the at least operation on the basis of the received information on the second external device.

The method for controlling an operation of an electronic device may further include an operation of transmitting the audio signal to be output through the first external device to the first external device.

The electronic device and the first external device may transmit and receive the data and/or the information and the audio signal using different communication protocols or different communication profiles.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device, comprising:
   a housing including a portion configured to detachably couple with a part of a user's ear;
   a sensor installed on an outer surface of the housing or in the housing;
   a communication circuit installed on the outer surface of the housing or in the housing;
   a speaker installed on the outer surface of the housing, exposed toward an eardrum of the ear, and electrically connected to the communication circuit;
   a processor electronically connected to the sensor, the communication circuit, and the speaker; and
   a memory electrically connected to the processor,
   wherein upon performance, the memory stores instructions to cause the processor to:
   receive at least one audio signal from a first external device using the communication circuit,
   change the received audio signal to a sound signal corresponding to preset user information including auditory characteristic information of a user and output the sound signal through the speaker,
   acquire data associated with at least a part of a state, a pose, or a movement of a user's body using the sensor, independent of the audio signal, and
   transmit the data or information extracted from the data to the first external device.

2. The electronic device of claim 1, wherein the sensor includes at least one of an accelerator sensor, a gyro sensor, a proximity sensor, a heart rate sensor, an electrocardiogram sensor, a pulse sensor, and a microphone.

3. The electronic device of claim 1, wherein reception of the audio signal and transmission of the data or the information are performed using different communication protocols or different communication profiles.

4. An electronic device, comprising:
   a housing;
   a display exposed to an outer surface of the housing;
   a communication circuit installed on the outer surface of the housing or in the housing;
   a processor electrically connected to the display and the communication circuit; and
   a memory electrically connected to the processor,
   wherein upon performance, the memory stores instructions to cause the processor to:
   receive data associated with at least a part of a state, a pose, or a movement of a user's head acquired by a first external device or information extracted from the data from the first external device, using the communication circuit,
   determine at least one action corresponding to the received data or the information,
   display at least one user interface configured to control the first external device or a second external device on at least a part of the display of the electronic device, and
   transmit a request to cause the second external device to perform at least a part of the at least one action to the second external device based on an input of a user received through the user interface for selecting at least a part of the at least one user interface.

5. The electronic device of claim 4, wherein the instructions cause the processor to transmit another request to cause the first external device to perform at least other parts of the at least one action to the first external device.

6. The electronic device of claim 4, wherein the instructions cause the processor to transmit an audio signal to be output through the first external device to the first external device.

7. The electronic device of claim 4, wherein the instructions, that when executed by the processor, are further configured to cause the processor to transmit another request to cause the first external device to perform at least other parts of the at least one action to the first external device based on the input of the user for selecting at least a part of the at least one user interface.

8. The electronic device of claim 4, wherein the at least one action includes at least one of an output of a sound signal, a generation of vibration, a display of a user interface, an execution of a specific function, and an analysis of the data or the information.

9. The electronic device of claim 4, wherein the instructions cause the processor to:
receive information associated with the second external device or information associated with the at least one action from the second external device using the communication circuit, and
determine the at least one action based on at least a part of the information received from the second external device.

10. The electronic device of claim 9, wherein the instructions cause the processor to display a user interface corresponding to the information received from the second external device.

11. The electronic device of claim 10, wherein the instructions cause the processor to determine the at least one action to be requested to the second external device depending on an input of a user received through the user interface.

12. The electronic device of claim 9, wherein the instructions cause the processor to transmit instruction words to transmit the data associated with at least a part of the state, the pose, or the movement of the user's body acquired by the first external device or the information extracted from the data to the electronic device or the second external device to the first external device based on the information received from the second external device.

13. An electronic device, comprising:
a housing;
a display;
a communication circuit installed on an outer surface of the housing or in the housing;
a processor electrically connected to the communication circuit; and
a memory electrically connected to the processor,
wherein upon performance, the memory stores instructions to cause the processor to:
receive data associated with at least a part of a state, a pose, or a movement of a user's head acquired by a first external device or information extracted from the data from the first external device, using the communication circuit,
display at least one user interface configured to control the first external device or a second external device on at least a part of the display of the electronic device, and
transmit a request to cause the second external device to perform at least one operation corresponding to the received data or the information to the second external device based on an input of a user received through the user interface for selecting at least a part of the at least one user interface.

14. The electronic device of claim 13, wherein the instructions cause the processor to:
determine to what extent part of the user's body moves based on the received data or information, and
transmit a request to perform at least one operation to the first external device or the second external device when a part of the user's body moves beyond a preset reference.

15. The electronic device of claim 14, wherein the at least one operation includes an operation of outputting a sound beyond a preset size or an operation of generating vibration beyond a preset strength.

16. The electronic device of claim 13, wherein the instructions cause the processor to:
receive information associated with the second external device from the second external device, and
determine the at least one operation based on the received information on the second external device.

17. The electronic device of claim 13, wherein the instructions cause the processor to transmit an audio signal to be output through the first external device to the first external device.

18. The electronic device of claim 17, wherein the electronic device and the first external device transmit and receive the data or the information and the audio signal using different communication protocols or different communication profiles.

19. A method for controlling an electronic device, comprising:
receiving at least one audio signal from a first external device;
changing the received audio signal to a sound signal and outputting the sound signal through a speaker;
acquiring data associated with at least a part of a state, a pose, or a movement of a user's body using at least one sensor, independent of the audio signal; and
transmitting the data or information extracted from the data to the first external device,
wherein the audio signal is changed to a sound signal corresponding to preset user information including auditory characteristic information of a user and output.

20. The method of claim 19, further comprising:
determining whether a user wears an electronic device based on the acquired data; and
transmitting information on which the user wears the electronic device to the first external device.

21. The method of claim 19, wherein the at least one sensor includes at least one of an accelerator sensor, a gyro sensor, a proximity sensor, a heart rate sensor, an electrocardiogram sensor, a pulse sensor, and a microphone.

22. The method of claim 19, wherein reception of the audio signal and transmission of the data or the information are performed using different communication protocols or different communication profiles.

23. A method for controlling an electronic device, comprising:
receiving data associated with at least a part of a state, a pose, or a movement of a user's head acquired by a first external device or information extracted from the data from the first external device;

determining at least one action corresponding to the received data or the information;

displaying at least one user interface configured to control the first external device or a second external device on at least a part of a display of the electronic device; and transmitting a request to cause the second external device to perform at least a part of the at least one action to the second external device based on an input of a user received through the user interface for selecting at least a part of the at least one user interface.

24. The method of claim 23, further comprising transmitting another request to cause the first external device to perform at least other parts of the at least one action to the first external device.

25. The method of claim 23, further comprising transmitting an audio signal to be output through the first external device to the first external device.

26. The method of claim 23, further comprising:

transmitting another request to cause the first external device to perform at least other parts of the at least one action to the first external device based on the input of the user for selecting at least a part of the at least one user interface.

27. The method of claim 23, wherein the at least one action includes at least one of an output of a sound signal, a generation of vibration, a display of a user interface, an execution of a specific function, and an analysis of the data or the information.

28. A method for controlling an electronic device, comprising:

receiving data associated with at least a part of a state, a pose, or a movement of a user's head acquired by a first external device or information extracted from the data from the first external device, using a communication circuit;

displaying at least one user interface configured to control the first external device or a second external device on at least a part of the display of the electronic device; and transmitting a request to cause the second external device to perform at least one operation corresponding to the received data or the information to the second external device based on an input of a user received through the user interface for selecting at least a part of the at least one user interface.

29. The method of claim 28, wherein the transmitting includes:

determining to what extent part of the user's body moves based on the received data or information; and transmitting a request to perform at least one operation to the first external device or the second external device when a part of the user's body moves beyond a preset reference.

30. The method of claim 29, wherein the at least one operation includes outputting a sound beyond a preset size or generating vibration beyond a preset strength.

31. The method of claim 28, further comprising:

receiving information associated with the second external device from the second external device; and determining the at least one operation based on the received information on the second external device.

32. The method of claim 28, further comprising:

transmitting an audio signal to be output through the first external device to the first external device.

33. The method of claim 28, wherein the electronic device and the first external device transmit and receive the data or the information and the audio signal using different communication protocols or different communication profiles.

* * * * *